(12) United States Patent
Castillo et al.

(10) Patent No.: US 8,780,074 B2
(45) Date of Patent: Jul. 15, 2014

(54) DUAL-FUNCTION TRANSDUCER FOR A TOUCH PANEL

(75) Inventors: Sergio G. Castillo, Oxfordshire (GB); Christopher J. Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 160 days.

(21) Appl. No.: 13/176,900

(22) Filed: Jul. 6, 2011

(65) Prior Publication Data

US 2013/0009905 A1      Jan. 10, 2013

(51) Int. Cl.
G06F 3/044 (2006.01)
G06F 3/041 (2006.01)

(52) U.S. Cl.
CPC ...... *G06F 3/044* (2013.01); *G06F 2203/04106* (2013.01); *G06F 3/0414* (2013.01)
USPC .......................................................... 345/174

(58) Field of Classification Search
CPC ................................ G06F 3/0414; G06F 3/044
USPC ............... 345/173–174, 82; 178/18.01, 18.05
See application file for complete search history.

(56) References Cited

U.S. PATENT DOCUMENTS

| | | | |
|---|---|---|---|
| 4,293,734 A | 10/1981 | Pepper, Jr. | |
| 5,510,813 A | 4/1996 | Makinwa et al. | |
| 5,915,285 A | 6/1999 | Sommer | |
| 6,492,979 B1 | 12/2002 | Kent et al. | |
| 7,511,702 B2 * | 3/2009 | Hotelling | 345/173 |
| 7,663,607 B2 * | 2/2010 | Hotelling et al. | 345/173 |
| 2007/0248799 A1 | 10/2007 | DeAngelis et al. | |
| 2008/0127739 A1 | 6/2008 | DeAngelis et al. | |
| 2009/0189485 A1 * | 7/2009 | Iyoki | 310/317 |
| 2009/0309616 A1 * | 12/2009 | Klinghult et al. | 324/686 |
| 2009/0315845 A1 | 12/2009 | Alexander | |
| 2009/0322702 A1 * | 12/2009 | Chien et al. | 345/174 |
| 2010/0110041 A1 * | 5/2010 | Jang | 345/174 |
| 2010/0123686 A1 * | 5/2010 | Klinghult et al. | 345/178 |
| 2010/0128002 A1 * | 5/2010 | Stacy et al. | 345/174 |
| 2010/0134483 A1 * | 6/2010 | Huang et al. | 345/214 |
| 2010/0156846 A1 * | 6/2010 | Long et al. | 345/174 |
| 2010/0164899 A1 * | 7/2010 | Wu et al. | 345/174 |
| 2010/0201635 A1 | 8/2010 | Klinghult et al. | |
| 2010/0259503 A1 | 10/2010 | Yanase et al. | |
| 2011/0248728 A1 | 10/2011 | Maruyama | |
| 2012/0086667 A1 | 4/2012 | Coni et al. | |

FOREIGN PATENT DOCUMENTS

| | | |
|---|---|---|
| JP | 07-064725 A | 3/1995 |
| JP | 2011-221677 A | 11/2011 |
| JP | 2012-084144 A | 4/2012 |
| WO | 2007/094993 A1 | 8/2007 |
| WO | 2008/038191 A2 | 4/2008 |
| WO | 2010/091744 A1 | 8/2010 |

OTHER PUBLICATIONS

"Metal-polymer composite with nanostructured filler particles and amplified physical properties", Applied Physics Letters 88, 102013 (2006).
International Search Report for PCT International Application No. PCT/JP2012/067873 dated Oct. 16, 2012.
Bloor et al., "Metal-polymer composite with nanostructured filler particles and amplified physical properties", Applied Physics Letters 88, 102013 (2006).

* cited by examiner

*Primary Examiner* — Andrew Sasinowski
(74) *Attorney, Agent, or Firm* — Renner, Otto, Boisselle & Sklar, LLP.

(57) ABSTRACT

A dual-function transducer for a force-sensitive multi-touch screen, including a first substrate, at least one electrode array formed on the first substrate, the at least one electrode array including first and second electrodes, and circuitry operatively coupled to the first and second electrodes. The circuitry is configured to measure first and second electrical properties of the electrode array, the first and second electrical properties corresponding to touch and strain, respectively.

37 Claims, 29 Drawing Sheets

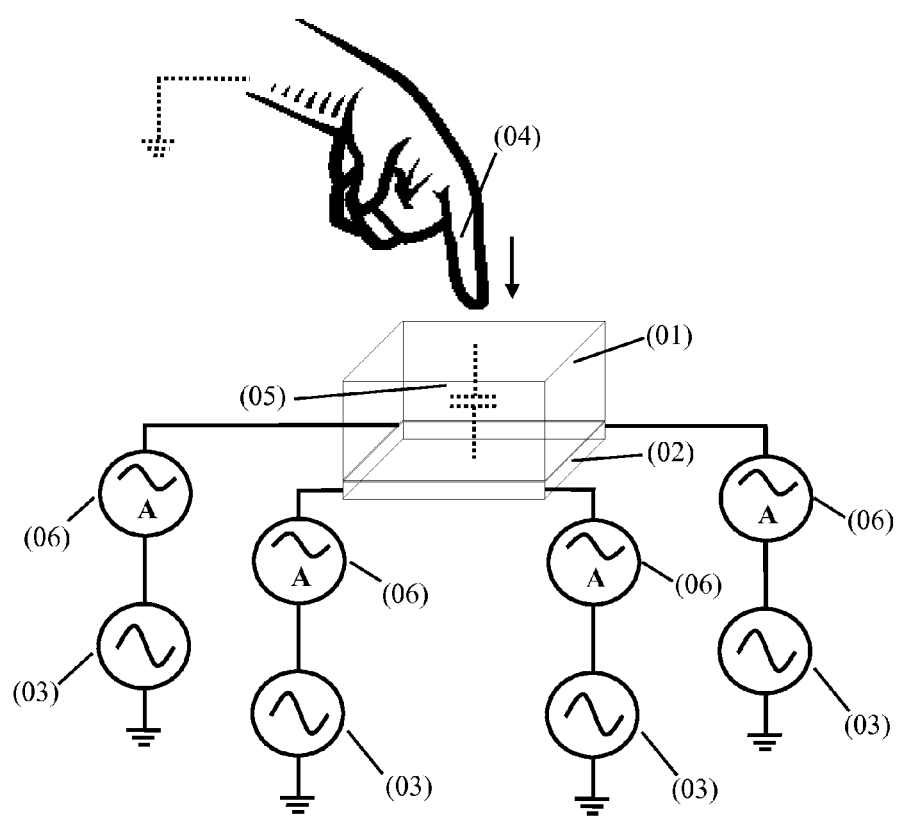
FIG 1 (Conventional)

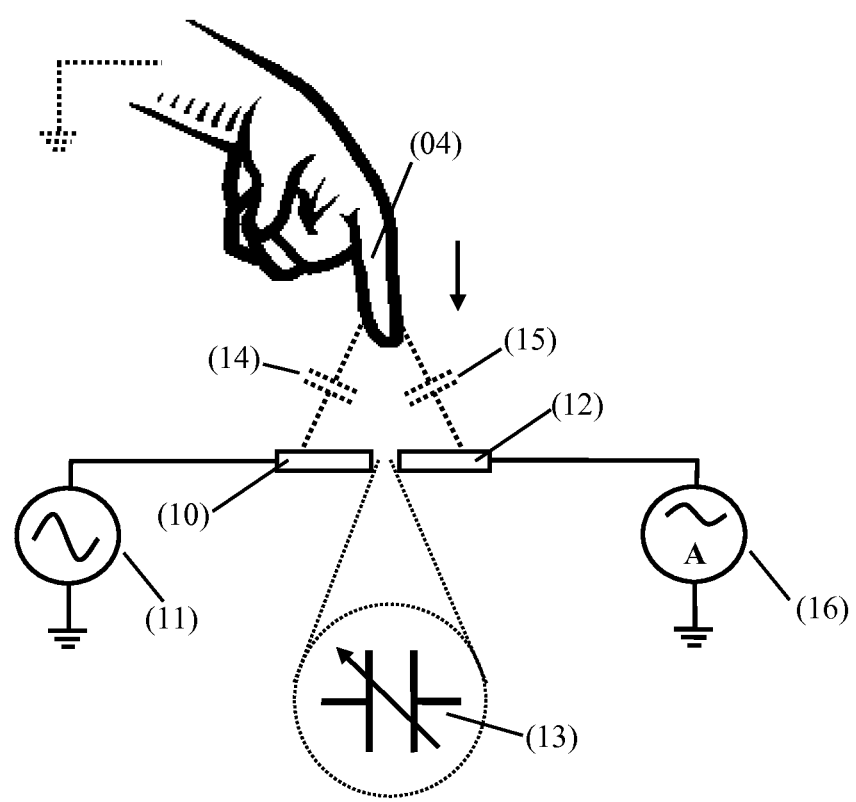
FIG 2 (Conventional)

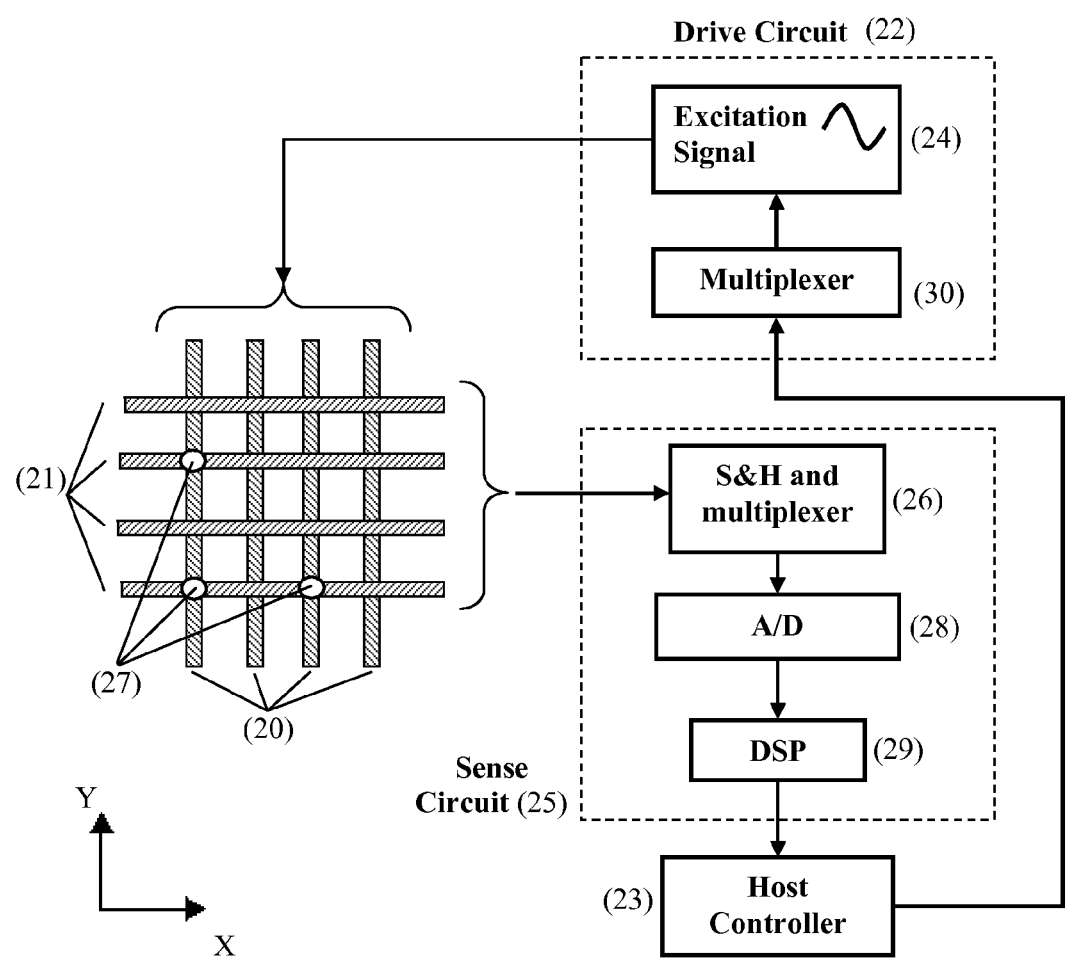
FIG 3 (Conventional)

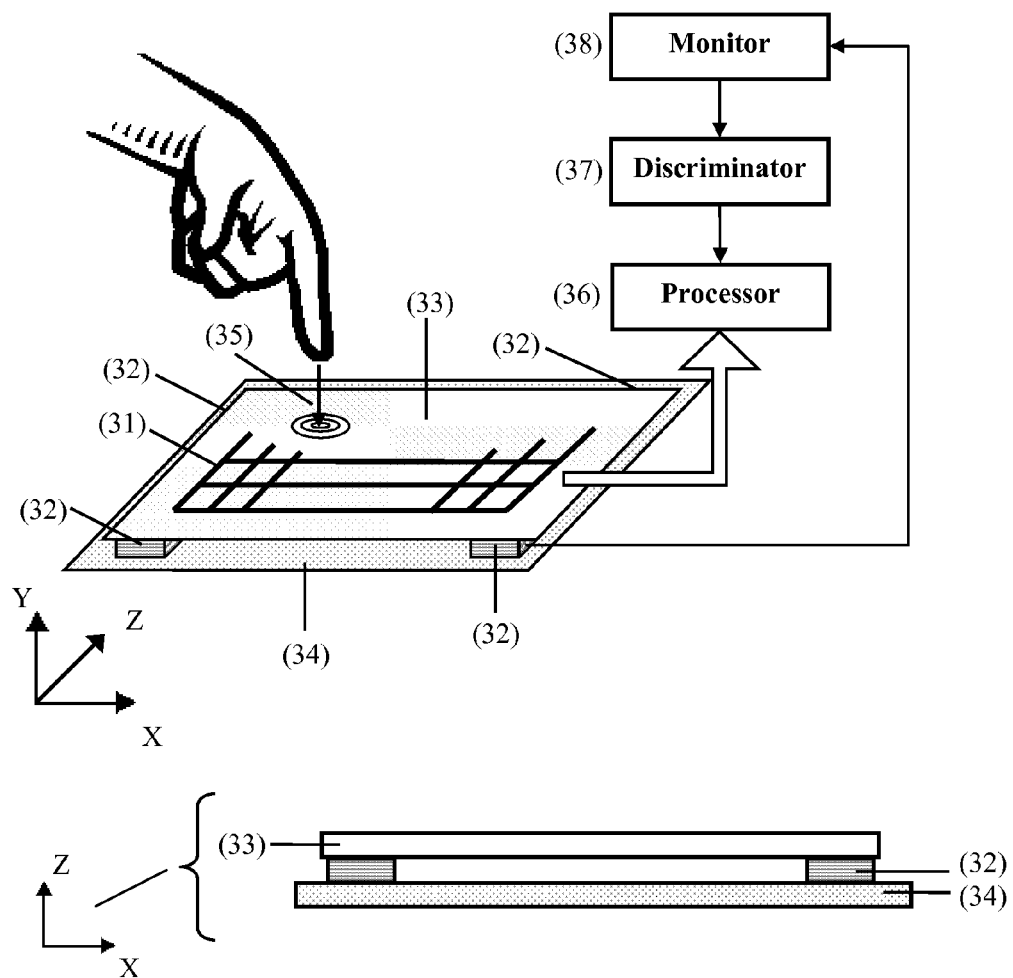
FIG 4 (Conventional)

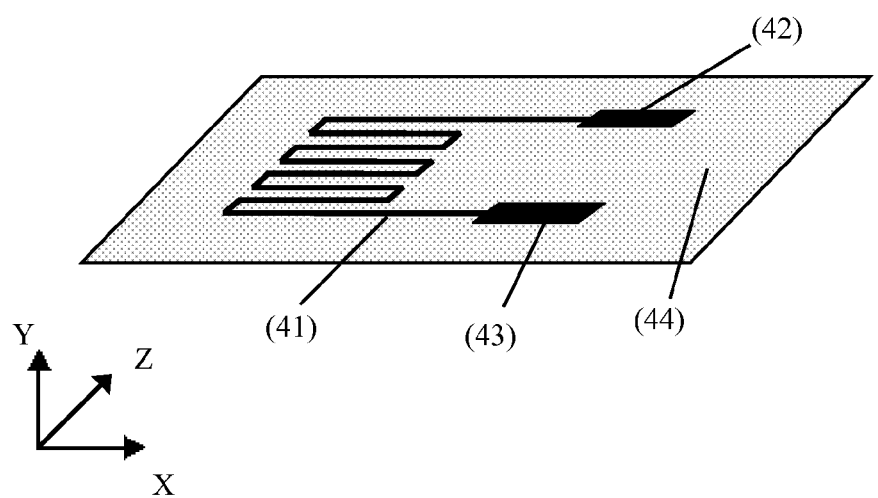
FIG 5 (Conventional)

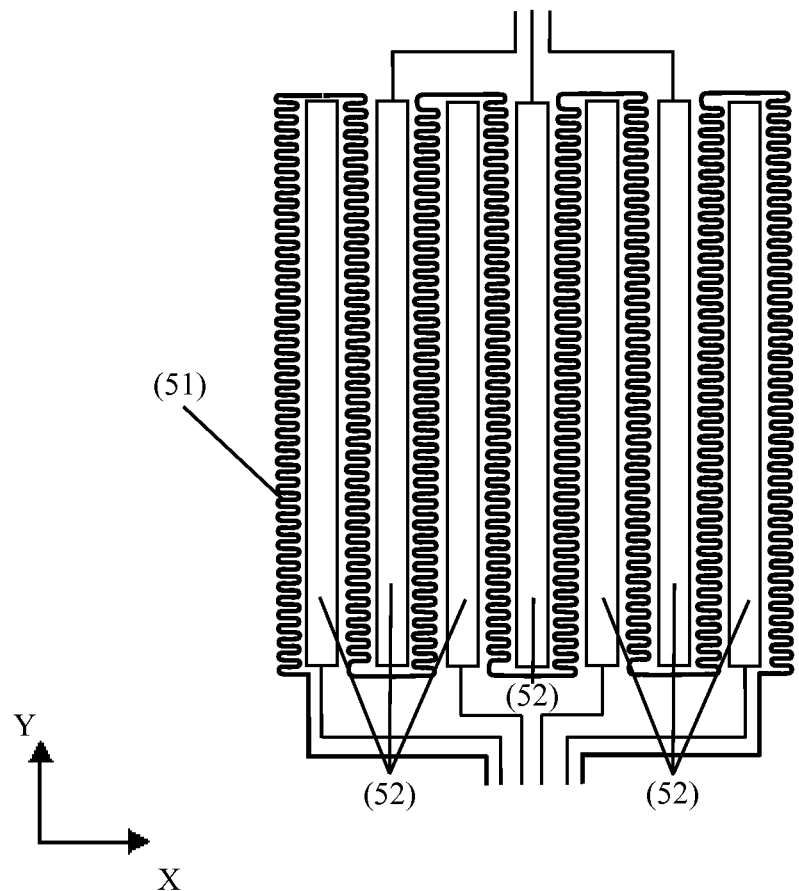
FIG 6 (Conventional)

DUAL-FUNCTION TRANSDUCER FOR A TOUCH PANEL

TECHNICAL FIELD

The current invention relates generally to a touch screen and, particularly but not exclusively, to force sensitive multi-touch screens. The invention further relates to a method to generate, scan and process the necessary signals to extract both multi-touch and multi-point force information from touch screens inputs.

BACKGROUND ART

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is demonstrated in surface capacitive systems as illustrated in FIG. 1. Surface capacitive systems, for example as disclosed in U.S. Pat. No. 4,293,734 (Pepper, Oct. 6, 1981) and US 201010259503A1 (Yanase, Oct. 14, 2010), usually employ a single non-conductive substrate (01) which has a conductive layer (02) on its underside. A small AC voltage (03) is imposed upon the conductive layer at several points of the substrate, resulting in a uniform electrostatic field. When a conductor, such as a human finger (04), touches the uncoated surface, a capacitor (05) is dynamically formed enabling the flow of current to and from the user's finger. The sensor's controller can determine the location of the touch input event indirectly from the change in the capacitance as measured from the corners of the panel by examining the relative magnitudes of the induced currents (06) sourced at each corner. Although simple, surface capacitive type systems are unable to detect multiple simultaneous touch input events as occurs when, for example, two or more fingers are in contact with the touch panel.

Another method of capacitive sensing applied to touch panels can be found in projected capacitive systems. As can be seen in FIG. 2, the projected capacitance system comprises a drive electrode (10) and sense electrode (12) which are formed on a substrate (not shown). The drive electrode is fed with a changing voltage or excitation signal (11) which induces a signal on the sense electrode (12) by means of a coupling capacitor (13) formed between the electrodes. When a conductor such as a human finger (04) is brought to close proximity to both electrodes, it forms a first dynamic capacitor (14) with the drive electrode and a second dynamic capacitor (15) with the sense electrode. The effect of these dynamically formed capacitances is manifested as a reduction of the amount of capacitive coupling in between the two electrodes effectively modulating the induced signal (16) at the sense electrode (12). This concept has been widely applied to touch panel systems where a plurality of projected capacitive sensors is employed allowing multiple simultaneous touch input events to be detected.

The projected capacitive method overcomes the problem of detecting multiple simultaneous touch input events associated with surface capacitance type systems by employing an array of electrodes arranged in horizontal rows and vertical columns wherein the array is sequentially driven by an excitation signal and sequentially scanned to generate capacitance measurement signals. FIG. 3 shows such an array as well as a schematic block diagram of a well-known type of projected capacitive system as disclosed in, for example, U.S. Pat. No. 7,663,607 (Hotelling, Feb. 16, 2010). In this particular case, each of the vertical columns is formed by a drive electrode (20) and each of the horizontal rows by a sense electrode (21). A drive circuit (22) under the control of a host controller (23) and a multiplexer (30) is used to sequentially apply an excitation signal (24) to each drive electrode in turn, such that, only a single drive electrode receives the excitation signal during one scan period. During this scan period, each sense electrode (21) is connected to sense circuit (25) by means of sample and hold (S&H) circuitry and a multiplexer (26) wherein the sense circuit is used to measure the signal generated by means of capacitance coupling between the currently active drive electrode (20) and the selected sense electrode (21). By means of scanning the location of the drive and sense electrode, a plurality of capacitance measurements which correspond to each row and column intersection or sensing point (27) may be generated. These measurements are then digitized by an analog-to-digital converter (28), further processed by a signal processing unit (29) to extract the touch co-ordinates and finally sent to the host controller (23). However, in spite of the multi-touch capabilities of the projected capacitive method, it has some significant limitations. For example, it cannot be used to detect the force of touch input and is unable to detect touch input from non-conductive objects such as a plastic stylus or pen.

In order to overcome these limitations, hybrid systems incorporating force sensing devices into projected capacitive touch panels have been proposed. "Metal-polymer composite with nanostructured filler particles and amplified physical properties", Applied Physics Letters 88, 102013 (2006), discusses a force sensitive material called Quantum Tunneling Composite (QTC) which may be used to form a ring around the periphery of the touch panel. The peripheral ring of QTC material provides a measure of the force being applied to the touch panel whilst the projected capacitive sensor detects the location of touch input. Alternatively, U.S. Pat. No. 6,492,979 (Kent, Dec. 10, 2002) describes a touch panel system incorporating discrete force sensing devices. As shown in FIG. 4, this system includes a touch panel (33) and a display (34) wherein the touch panel comprises a projected capacitive sensor (31) which provides measurement of the touch input location (35) and four strain sensors (32), positioned at the four corners of the display, which provide a measurement of the force of touch input. A processor (36) controls the touch panel and the display and determines the coordinates of the touch. The force sensors (32) provide a measurement of the force of the touch input event with the aid of a monitor (38) and a discriminator (37) to verify the validity of the touch and its coordinates.

As another alternative, the force sensor may be formed in the touch panel sensing layer itself. For example, U.S. Pat. No. 5,915,285 (Sommer, Jun. 22, 1999) (FIG. 5) describes a planar strain gauge structure in which the strain gauge (41) is formed on a transparent substrate (44) by a transparent material such as Indium Tin Oxide (ITO). A first terminal (42) and a second terminal (43) are provided at either end of the structure. The geometry of the gauge is chosen to be sensitive to tension and compression forces along one particular axis by appropriate design of the sensor electrodes. Accordingly, strain along that axis causes a change in resistance between the first terminal (42) and the second terminal (43). US2010/0128002 (Stacy, May 27, 2010) further describes the incorporation of such a transparent strain gauge into a projected capacitive touch panel device. FIG. 6 illustrates this arrangement whereby the strain gauge electrodes (51) are inter-digitated with but electrically isolated from the touch sensor electrodes (52).

A significant limitation of all of the hybrid touch panel devices described above however, is that even though the projected capacitive sensor is capable of determining the location of multiple simultaneous touch input events, the force sensor is incapable of uniquely determining the input force associated with each individual touch input event. It is therefore impossible to calculate, for example, the force being applied by any one particular input object and the utility of the device is greatly limited.

SUMMARY OF INVENTION

This invention describes a touch panel device that provides a measurement of both the location and force of multiple simultaneous touch input events. The invention proposes a system which employs an electrode array, known as a dual-function transducer, which is controlled by two distinct driving methods to enable projected capacitive and strain gauge force sensing. A first driving method is used to configure the transducer as a projected capacitance sensor to detect multiple touch events. A second driving method is used to configure the same transducer for use as a strain sensor to obtain the force applied to each touch. The invention therefore overcomes the inherent limitations of each separate technology (i.e. projected capacitive and strain sensing). In comparison with prior art, the concept allows the spatial resolution of the touch panel to be maximized, thus enabling an accurate multi-touch system capable of multi-point force sensing and which responds to multiple simultaneous touch input events from both conductive and non-conductive input objects with little or no activation force.

According to one aspect of the invention, a dual-function transducer for a force-sensitive multi-touch screen includes: a first substrate; at least one electrode array formed on the first substrate, the at least one electrode array including first and second electrodes; and circuitry operatively coupled to the first and second electrodes, the circuitry configured to measure first and second electrical properties of the electrode array, the first and second electrical properties corresponding to touch and strain, respectively.

According to one aspect of the invention, at least one of the first electrode or the second electrode shows piezoresistive characteristics or is patterned to enable detection of tension or compression forces for a force component that is perpendicular to a plane of the first substrate on which the first and second electrodes are formed.

According to one aspect of the invention, at least one of the first or second electrode is patterned such that the at least one of the first or second electrode is responsive to changes in both capacitance and strain.

According to one aspect of the invention, the electrode pattern comprises at least one of a square-wave pattern, a sinusoidal pattern, or a zig-zag pattern.

According to one aspect of the invention, the first electrode is formed on a first surface of the first substrate and the second electrode is formed on a second surface of the first substrate to create a coupling capacitor between the first and second electrodes.

According to one aspect of the invention, first and second ends of the first electrode are terminated with first and second conductive pads, respectively, and first and second ends of the second electrode are terminated with third and fourth conductive pads, respectively.

According to one aspect of the invention, the first transparent substrate comprises at least one of glass, plastic or polyethylene.

According to one aspect of the invention, the at least one electrode array comprises a plurality of electrode arrays, and the electrodes of each electrode array form a multi-channel touch panel system.

According to one aspect of the invention, the plurality of electrode arrays are arranged in a row and column format, and the first and second electrodes of the plurality of electrode arrays form a set of row electrodes and a set of column electrodes, respectively.

According to one aspect of the invention, the device further includes dummy features arranged in a space formed between row electrodes and column electrodes.

According to one aspect of the invention, the circuitry comprises a controller configured to drive the plurality of electrode arrays in a first mode for measuring a capacitance at an intersection of the respective first and second electrodes, and a second mode for measuring the strain within individual electrodes of the electrode array.

According to one aspect of the invention, the controller is configured to measure the strain based on a change in resistance of the first and/or second electrode of each electrode array.

According to one aspect of the invention, the controller is configured to detect multiple and simultaneous touch input events generated by a conductive object within a predetermined distance of or contacting one or more of the plurality of electrode arrays.

According to one aspect of the invention, the controller is configured to measure capacitance during a first time period, and measure strain during a second time period, the second time period different from the first time period.

According to one aspect of the invention, the controller is configured to simultaneously measure strain for each electrode of the plurality of electrode arrays.

According to one aspect of the invention, the circuitry comprises: a capacitance measuring circuit operatively coupled to the at least one electrode array and configured to measure a capacitance of the at least one electrode array; and a resistance measuring circuit operatively coupled to the at least one electrode array and configured to measure a resistance of the at least one electrode array.

According to one aspect of the invention, the circuitry further comprises a decoder circuit operatively coupled to the at least one electrode array, the capacitance measuring circuit and resistance measuring circuit, the decoder circuit configured to selectively couple the at least one electrode array to the capacitance measuring circuit and the resistance measuring circuit.

According to one aspect of the invention, the at least one electrode array is patterned to form an interlocking rhombus structure.

According to one aspect of the invention, the interlocking rhombus structure comprises the first and second electrodes of the at least one electrode array arranged in an overlapping configuration.

According to one aspect of the invention, the at least one electrode array is formed as a single-layer electrode structure arranged over the first substrate.

According to one aspect of the invention, the single-layer electrode structure comprises an electrode grid layer arranged over the first substrate, an insulating layer arranged over the electrode grid layer, and a metal bridge layer arranged over the insulating layer.

According to one aspect of the invention, the at least one electrode array is formed as a multi-layer electrode structure.

According to one aspect of the invention, the multi-layer electrode structure comprises: a first layer including a set of row electrodes formed on a top surface of the first substrate; a second substrate; a second layer including a set of column electrodes formed on a bottom surface of the second substrate, wherein the first layer and second layer face each other; and a bonding electrical insulator layer arranged between the first and second layers.

According to one aspect of the invention, the multi-layer electrode structure comprises: a first single layer electrode structure arranged on a first side of the first substrate; and a second single layer electrode structure arranged on a second side of the first substrate.

According to one aspect of the invention, the first and second electrode structures each comprise an interlocking rhombus structure.

According to one aspect of the invention, the device includes a reference electrode formed adjacent to at least one of the first or second electrodes, wherein a geometry of the reference electrode is configured such that a resistance of the reference electrode corresponds to a nominal resistance of the first or second electrode and is independent of strain.

According to one aspect of the invention, the device includes a differential amplifier electrically coupled to the reference electrode and a sensing electrode, the differential amplifier operative to provide a measurement of force applied to the sense electrode independent of temperature.

According to one aspect of the invention, the device includes a reference electrode formed adjacent to at least one of the first or second electrodes, wherein the reference electrode is arranged to provide a change in resistance due to an applied force that is opposite a change in resistance of the at least one first or second electrode due to the applied force.

According to one aspect of the invention, when a force is applied to the first or second electrode, the first or second electrode receives one of a compressive strain or a tensile strain, and the reference electrode receives the other of the compressive strain or the tensile strain.

According to one aspect of the invention, a display device includes a display; and a touch panel including a plurality of transducers as described herein, the touch panel arranged over an outer surface of the display.

According to one aspect of the invention, a method is provided for measuring capacitance and strain for a plurality of cells of a touch panel, the touch panel including a plurality of electrode arrays, respective ones of the plurality of electrode arrays corresponding to respective ones of the plurality of cells, the plurality of electrode arrays formed on a substrate and including first and second electrodes, wherein each electrode array is patterned such that the first and second electrodes are responsive to changes in both capacitance and strain. The method includes: selectively coupling each electrode array to a capacitance measuring circuit; measuring a capacitance for multiple and simultaneous touch events on the touch panel; and correlating a change in capacitance for each cell to a location of an independent touch event.

According to one aspect of the invention, measuring the capacitance comprises configuring the electrode array as a projected capacitance sensor.

According to one aspect of the invention, measuring the capacitance comprises measuring the capacitance at an intersection of the first and second electrodes.

According to one aspect of the invention, the method includes: selectively coupling each electrode array to a resistance measuring circuit; measuring a change in resistance of each electrode; and correlating the change in resistance to a force applied to the cell.

According to one aspect of the invention, measuring the capacitance is performed during a first time period, and measuring the change in resistance is done during a second time period different from the first time period.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1—Conventional "Surface capacitance" system.
FIG. 2—Conventional "projected capacitive" sensor.
FIG. 3—Schematic diagram of a projected capacitive system.
FIG. 4—"Force sensitive touch panel" with peripheral force sensors.
FIG. 5—Planar ITO strain gauge coated in either glass or polymer.
FIG. 6—Conventional force and touch sensitive display.

DESCRIPTION OF REFERENCE NUMERALS

Figure 7A:
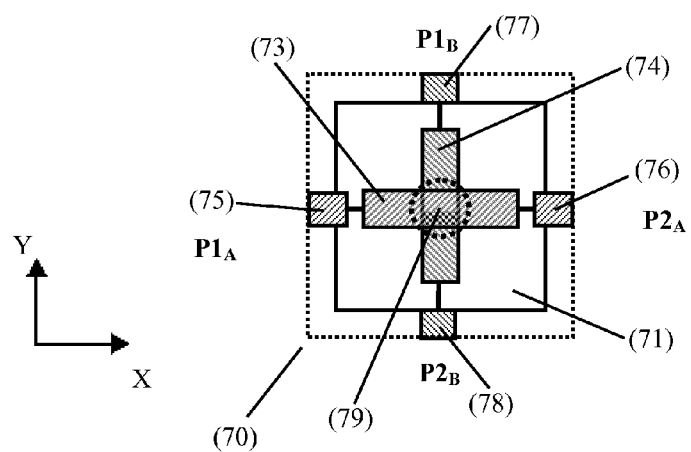
FIG. 7A—Plan view of dual-function transducer of first embodiment
FIG. 7B—Cross-section view of dual-function transducer of first embodiment
FIG. 7C—Electrode pattern of dual-function transducer of first embodiment
FIG. 8—Circuit diagram of single-channel, first embodiment
FIG. 9—Waveform diagram of single-channel, first embodiment
FIG. 10—Capacitance sensor circuit of first embodiment
FIG. 11—Strain sensor circuit of first embodiment
FIG. 12A—Block diagram of touch panel system of the second embodiment
FIG. 12B—Schematic circuit diagram showing detail of switching stage of touch panel system of the second embodiment
FIGS. 13A-13B—Waveform diagram illustrating operation of second embodiment
FIG. 14—Diagram illustrating operation of touch panel system
FIG. 15A—Set of first electrodes arranged in rows of fourth embodiment
FIG. 15B—Set of second electrodes arranged in columns of fourth embodiment
FIG. 15C—Cross-section view of electrodes' arrangement of fourth embodiment
FIG. 16—Strain sensor circuit of fourth embodiment
FIG. 17A—Top view of electrode sets of the fifth embodiment
FIG. 17B—Top view of interlocking rhombus structure of fifth embodiment
FIG. 18A—Cross-section view of electrode pattern of sixth embodiment
FIG. 18B—Plan view of electrode pattern of sixth embodiment FIG. 18C—Insulating layer mask with metal bridges of sixth embodiment FIG. 19—Dual-layer electrode structure of seventh embodiment FIG. 20—Multi-layer electrode structure of eighth embodiment FIG. 21—Plan view of the dual-function transducer arrangement of the ninth embodiment FIG. 22—Schematic diagram of resistance measuring circuit of ninth embodiment.

01—Non-conductive substrate
02—Conductive layer
03—Small AC voltage
04—Human finger
05—Dynamically formed capacitor
06—Induced currents
10—Drive electrode
11—Excitation signal
12—Sense electrode
13—Coupling capacitor
14—First dynamic capacitor
15—Second dynamic capacitor
16—Induced signal
20—Projected capacitive drive electrode
21—Projected capacitive sense electrode
22—Drive circuit
23—Host Controller
24—Projected capacitive excitation signal
25—Sense circuit
26—Sample and Hold and multiplexer
27—Sensing point
28—Analog-to-digital converter
29—Digital Signal Processing (DSP) unit
30—Multiplexer
31—Projected capacitive sensor
32—Peripheral strain sensors
33—Touch panel
34—Display
35—Touch input location
36—Processor
37—Discriminator
38—Monitor
41—Planar strain gauge
42—First terminal of strain gauge
43—Second terminal of strain gauge
44—Transparent substrate
51—Strain gauge electrodes
52—Touch sensor electrodes
70—Dual-function transducer
71—Dual function transducer's transparent substrate
72—Dual function transducer's coupling capacitor
73—Dual function transducer's first electrode
74—Dual-function transducer's second electrode
75—Dual function transducer's first conductive pad
76—Dual function transducer's second conductive pad
77—Dual function transducer's third conductive pad
78—Dual function transducer's fourth conductive pad
79—Dual function transducer's intersection point
81—Dual function transducer's sensor circuit
82—Capacitance sensor circuit
83—Strain sensor circuit
84—Capacitance drive circuit
85—Capacitance measurement circuit
86—Resistance drive circuit
87—Resistance measurement circuit
88—Analog decoder circuit
89—Stray capacitances
101—Inverting amplifier
102—Inverting amplifier's feedback capacitor
103—Inverting amplifier's feedback resistor
104—Difference amplifier
105—Difference amplifier's gain resistor
106—Bridge circuit configured as a quarter-bridge
108—Set of row electrodes
109—Set of column electrodes
110—Intersection point for row and column electrodes
111—Multi-channel array structure of dual function transducers
112—Common sensor circuit
113—Common analog decoder
114—Common capacitance drive circuit
115—Common resistance drive circuit
116—Common measuring capacitance circuit
117—Common resistance measurement circuit
118—Multiplexer
119—Analog-to-digital converter
120—Controller
121—Coupling capacitor of multi-channel array
123—Display arrangement
124—Touch panel screen
125—Simultaneous touch input events
126—Coordinates of each touch generated by conductive input objects
127—Row electrode of multi-channel array
128—Column electrode of multi-channel array
129—Switching stages
133—Dummy features
141—Rhomboidal strain sensor
151—Electrode grid layer
152—Insulator layer
153—Metal bridge layer
154—Unmasked region of insulator layer
155—Metal bridges
156—Single-layer transducer arrangement
157—Single-layer interlocking rhombus structure
160—Instrumentation amplifier
161—First buffered amplifier
162—Second buffered amplifier
163—Set of matched resistors $R_{IA}$
164—Gain resistor $R_G$
165—Differential amplifier
166—Identical resistors for half-bridge
167—Bridge circuit with two electrodes
191—Bonding electrical insulator
192—First layer of first electrodes
193—Second layer of second electrodes
211—Set of row reference electrodes
212—Set of column reference electrode
213—Row reference electrode
214—Column reference electrode
215—Bridge circuit with reference electrode
219—First transparent substrate
220—Second transparent substrate
221—First interlocking single-layer electrode structure
222—Row sensing electrode
223—Column sensing electrode
224—Second interlocking single-layer electrode structure
225—Row reference electrode
226—Strain sensitive column electrode

DETAILED DESCRIPTION OF INVENTION

This invention describes a touch panel system which incorporates projected capacitive and planar strain gauge force sensors within the same device. The invention employs an array of electrodes capable of providing strain and capacitance measurements, herein referred to as a dual-function transducer. A projected capacitive sensing method is employed to detect and localize different touches generated by conductive input objects contacting or within a predetermined distance of touch panel (e.g. a plurality of finger touch input events) with minimal or non-existent force input. A strain gauge force sensing method is used to measure the force applied by each touch input event generated by both conductive (e.g. fingers) and non-conductive input objects such as a plastic stylus or pen. Compared to other known solutions a unique and accurate measurement of force can be provided for each touch location.

Figure 7B:
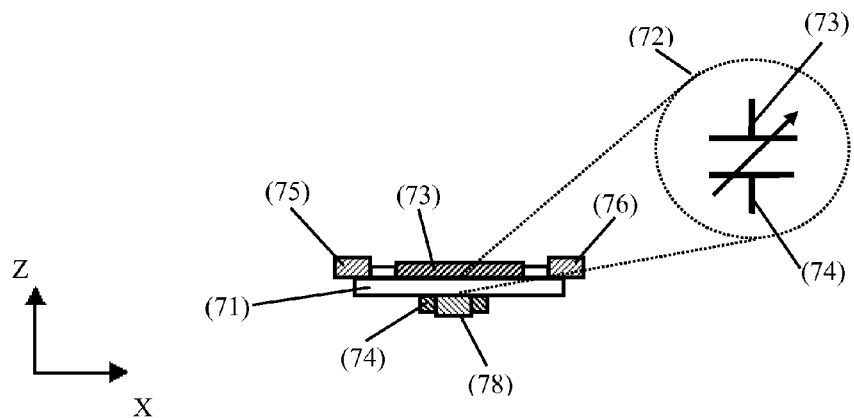
Figure 7C:
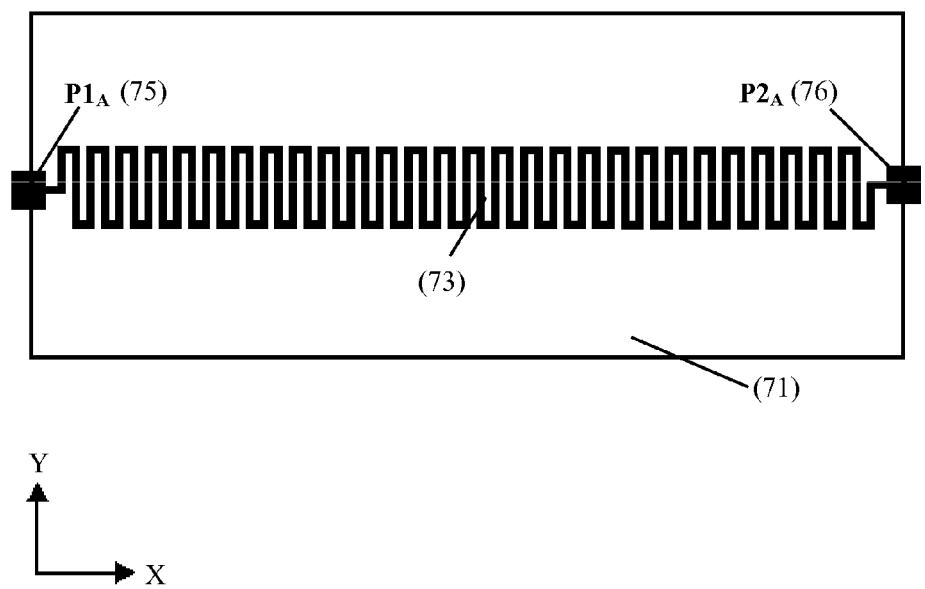

A block diagram of the most basic embodiment of the present invention can be seen in FIGS. 7A, 7B and 7C. In its simplest form (FIG. 7A), a dual function transducer (70) consists of an array of only two electrodes i.e. a first electrode (73) and a second electrode (74), formed on a transparent substrate (71) (also referred to as a first transparent substrate). The transparent substrate may be of any suitable insulating material—for example, glass, plastic, polyethylene or the like, and the electrodes may be used to measure either the capacitance associated with the intersection (79) of the electrodes or the strain within each individual electrode. The first electrode (73) is terminated with a first conductive pad (75) at one end and a second conductive pad (76) at the other end, herein referred as "$P1_A$" and "$P2_A$" respectively. Correspondingly, the second electrode (74) is terminated at each end with a third conductive pad (77) and a fourth conductive pad (78), herein referred as "$P1_B$" and $P2_B$" respectively. Circuitry (not shown in FIGS. 7A-7C) is operatively coupled to the first and second electrodes. The circuitry is configured to measure first and second electrical properties of the electrode array, the first and second electrical properties corresponding to touch and strain, respectively.

As shown in FIG. 7B, the first electrode (73) is formed on a first surface of the transparent substrate (71), the second electrode (74) is formed on the second surface of the transparent substrate (71) (e.g., the second surface being opposite to the first surface) and a coupling capacitor (72) therefore exists between the first and second electrodes. The transparent substrate may serve both as an electrical insulator between the electrodes and as a bonding element providing mechanical robustness to the electrodes. The electrodes may be formed by a transparent and conductive material with resistance which as a function of the strain in the material. Strain may be induced in the electrodes by application of a force perpendicular to the plane on which the electrodes are formed. The variation of resistance may be produced as a result of the geometric features of the electrode—for example the shape (pattern) or cross-section of the electrode—or as a result of the electrode's material properties such as piezo-resistance, or as a result of the combination of both. The first and second electrodes can be made of, for example, Indium Tin Oxide (ITO), Aluminium Zinc Oxide (AZO), nano-wires, graphene, carbon nano-tubes or the like.

For the dual-function transducer to provide both capacitance and strain measurements, the first electrode (73), or the second electrode (74), or both the first and second electrodes may be patterned to allow the detection of tension or compression forces with a component which is perpendicular to the plane of the substrate on which the first and second electrodes are formed (e.g., at least one of the first or second electrodes of the electrode array is patterned such that the first and/or second electrode is responsive to changes in both capacitance and strain). The electrode pattern may be for example a "zig-zag pattern", a sinusoidal pattern (e.g., "snake shaped wire"), a square-wave pattern, or any wire with an arbitrary but well defined shape so that the wire's resistance changes when the wire is subject to compressive or tensile forces. FIG. 7C shows one such suitable pattern. Further, since the area occupied by the electrode when patterned into one of the above described shapes is not substantially changed, there is no significant effect on the mutual coupling (i.e. projected) capacitance measured at the intersection between the first and second electrodes. Alternatively, the first electrode (73), or the second electrode (74), or both the first and second electrodes may remain un-patterned and be made of a transparent conductor with a piezo-resistive characteristic (e.g. ITO) which is responsive to said tensile and compression forces.

In order to provide both capacitance and strain measurements, the dual-function transducer is controlled with two distinct driving methods. On one hand, a change in the capacitance between the electrodes can be measured in a first driving method. In this first driving method, the first electrode (73) acts as a drive electrode and the second electrode (74) acts as a sense electrode as is known in a projected capacitive type sensor. The amplitude of the signal induced in the sense electrode in response to the excitation signal applied to the drive electrode is detected, providing a measurement of the capacitance between the electrodes. On the other hand, in a second driving method, the change in resistance of each electrode is measured. In this second method, the force of an input object causes mechanical deformation of each electrode inducing strain and resulting in the aforementioned resistance change. The electrodes' resistance can be accurately measured by, for example, detecting the magnitude of the current flowing through the corresponding electrode when a constant voltage is applied across to its conductive pads. Alternatively, the electrode's resistance can be obtained by applying a constant current and measuring the amplitude of the voltage across the electrode's conductive pads.

Figure 8:
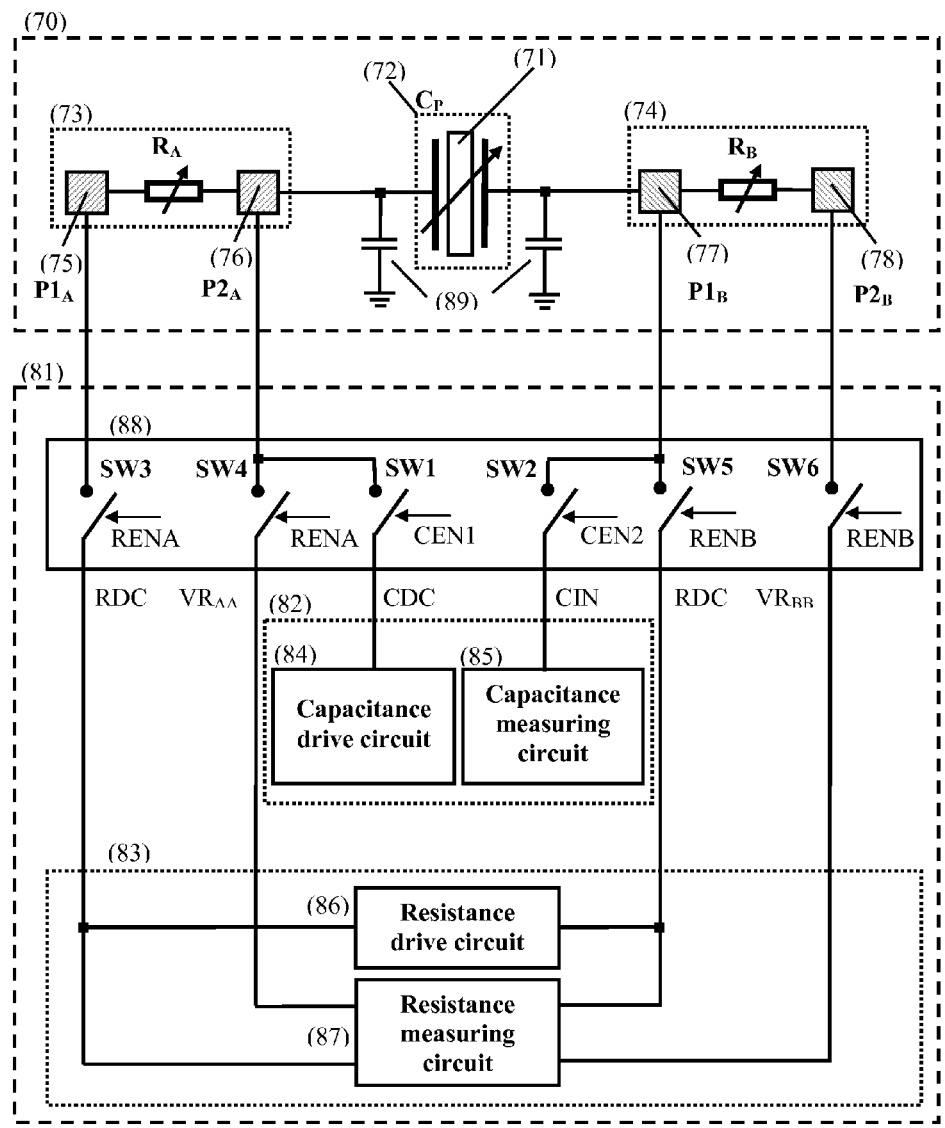

FIG. 8 shows an equivalent circuit model of the dual-function transducer (70) along with a diagram of the sensor circuit (81) that may be used to obtain the capacitance and strain measurements according to the first and second driving methods described above. The dual-function transducer's equivalent circuit model comprises: a first electrode (73) that may be represented as a conductor with a variable resistance $R_A$ which is a function of the strain applied to the first electrode, and a second electrode (74), that may be depicted as a wire with a variable resistance $R_B$ which is a function of the strain applied to the second electrode. The projected capacitance at the intersection between the first and second electrodes is indicated by the variable capacitor $C_P$ (72). Each electrode is terminated by the conductive pads described above from where signals are driven to and read out by the sensor circuit (81). The sensor circuit (81) comprises a capacitance sensor circuit (82) and a strain sensor circuit (83). The capacitance sensor circuit (82) further comprises a capacitance drive circuit (84) and a capacitance measurement circuit (85). The strain sensor circuit (83) comprises a resistance drive circuit (86) and a resistance measurement circuit (87). An analog decoder circuit (88) encloses the switches SW1 to SW6 which interface the dual function transducer with the capacitance and strain sensor circuits.

The relation strain-resistance in a electrode (transparent-conductor) such as the one described here may, for example, be given by:

$$\Delta R/R = \Delta l/l - \Delta w/w - \Delta t/t + \Delta \rho/\rho$$

Where: $\Delta R/R$ is the total change in resistance of the gauge; $\Delta l/l$, $\Delta w/w$, $\Delta t/t$ are the changes in shape (length, width and thickness respectively) of the electrode; $\Delta \rho/\rho$ is the change in resistivity due to piezo-resistance. The changes in shape are the dominant mechanism for metallic materials. The change in resistivity is the dominant factor in semi-conductors (for example ITO).

Figure 9:
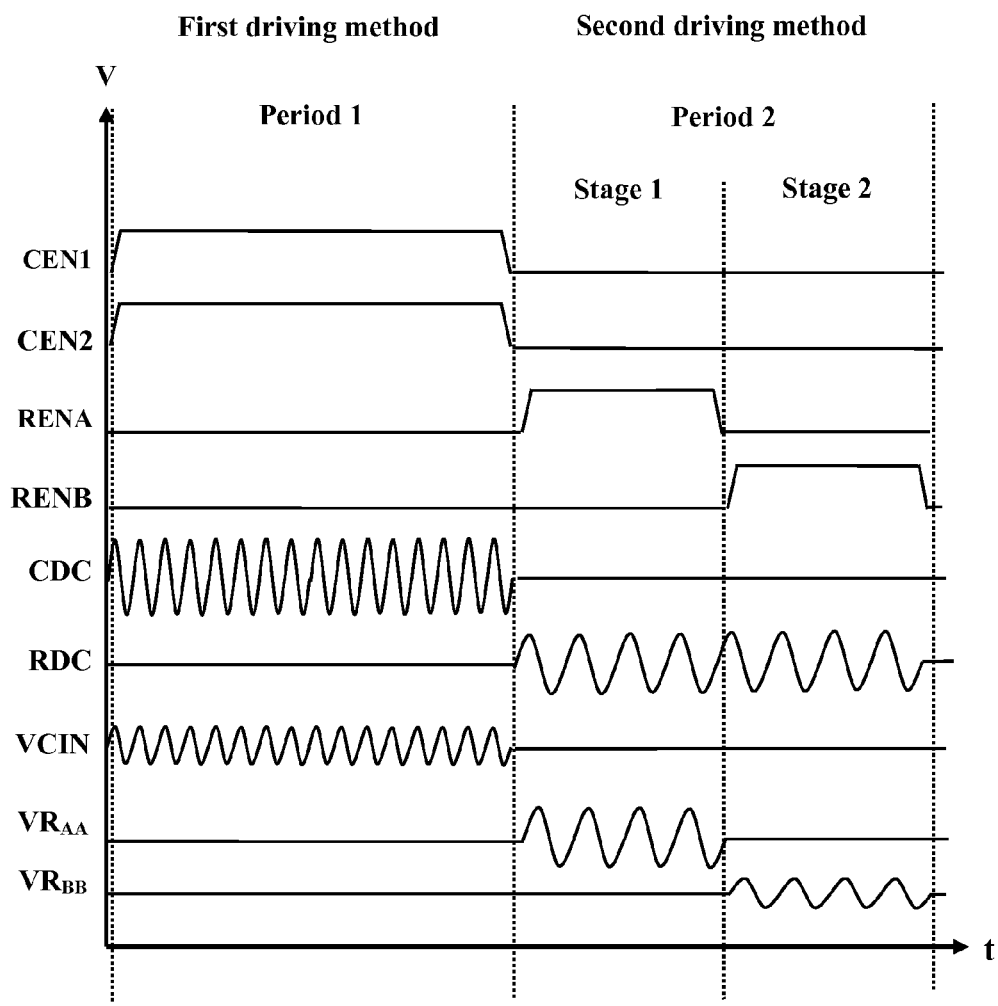

The operation of the sensor circuit is now described with reference to the schematic diagram of FIG. 8 and the waveform diagram of FIG. 9. The first driving method may be applied during a first period. In this period, switch SW1 is closed under command of a first enable signal CEN1 thus connecting the capacitance drive circuit (84) to the pad P2$_A$ (76) and configuring the first electrode (73) as a drive electrode. SW2 is closed under command of a second enable signal CEN2, causing the capacitance measuring circuit (85) to be connected to the pad P1$_B$ (77). The dual function transducer is now configured as a projected capacitance sensor with the second electrode (74) acting as the sense electrode. An AC excitation voltage signal, CDC, generated by the capacitance drive circuit is then applied to the pad P2$_A$ (76). The capacitance measuring circuit (85) now determines the capacitance of the intersection of the first and second electrode, for example by measuring the amplitude of the induced signal, CIN, on P1$_B$ and converting it into an equivalent voltage VCIN. All other switches apart from SW1 and SW2 remain open during this first period.

Following the first period, the second driving method may be applied in a second period of operation. The second period may further comprise two stages. In a first stage, switches SW3 and SW4 are closed under command of an enable signal RENA thus connecting the resistance drive circuit (86) to pad P1$_A$ (75) of the first electrode (73) and the resistance measuring circuit to both pad P1$_A$ (75) and pad P2$_A$ (76) of the first electrode (73). The dual function transducer is now configured to measure the strain induced in the first electrode (73). An AC or DC voltage signal, RDC, is then generated by the resistance drive circuit (86) and applied to pad P1$_A$ (75). The resistance measuring circuit (87) measures the resistance of the first electrode, R$_A$, by detecting the amplitude of the voltage signal VR$_{AA}$ generated at pad P2A or by detecting the current flowing into it. In a second stage, switches SW5 and SW6 are closed under command of an enable signal RENB thus connecting the resistance drive circuit (86) to pad P1$_B$ (77) of the second electrode (74) and the resistance measuring circuit to both pad P1$_B$ (77) and pad P2$_B$ (78) of the second electrode (74). The dual function transducer is now configured to measure the strain induced in the second electrode. An AC or DC voltage signal, RDC, is generated by the resistance drive circuit (86) and applied to pad P1$_B$ (77). The resistance measuring circuit (87) measures the resistance of the second electrode, R$_B$, by detecting the amplitude of the voltage signal VR$_{BB}$ generated at pad P2$_B$ or by detecting the current flowing into it. Switches SW1 and SW2 remain permanently open during the second period. The strain induced by touch input events in both the first and second electrodes is therefore measured in the second period.

It should be noted that the above description of operation is intended to illustrate the concept of performing a first and second driving method in a respective first and second period. Other methods of measuring the capacitance or strain exist. For example, in an alternative second driving method, during the second period the switches SW3, SW4, SW5 and SW6 may be closed at the same time and the resistance of the first electrode (73) and the second electrode (74) measured simultaneously.

Figure 10:
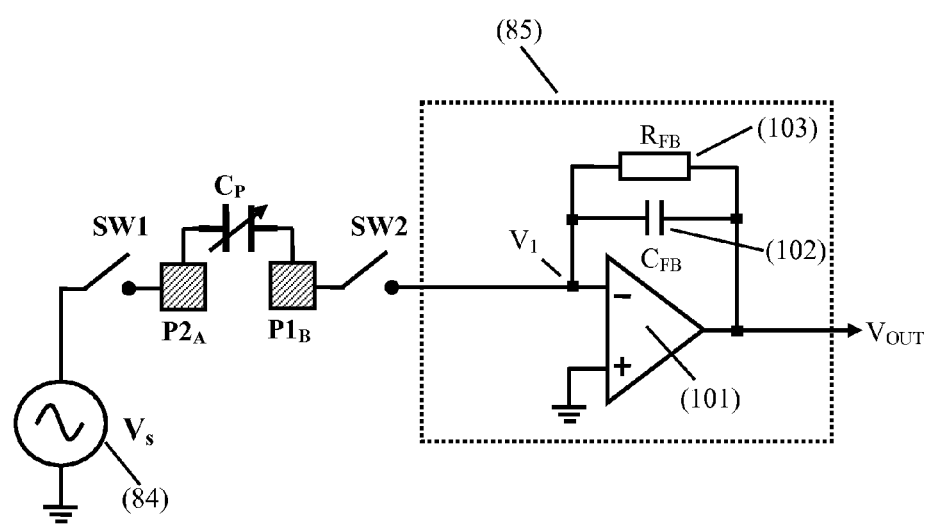

The capacitance sensor circuit (82) may comprise a capacitance measurement circuit (85) of a known type, for example as disclosed in "Capacitive Sensors, Design and Applications", L. K. Baxter, IEEE Press, and shown in FIG. 10. The capacitance sensor circuit (82) may also include a capacitance drive circuit (84) of known construction, such as an AC voltage source (V$_s$). The CDC signal, generated by the capacitance drive circuit (84), can take the form of a sinusoidal, triangular, a square wave signal or a periodic signal with a defined shape, amplitude and frequency so that it can be measured and further conditioned by the capacitance measurement circuit (85). In this exemplary arrangement, the capacitance measurement circuit (85) further consists of an inverting amplifier (101), a feedback capacitor (102), denoted by C$_{FB}$ and a large feedback resistor (103), denoted by R$_{FB}$. As previously described, during the first driving period corresponding to the first driving method, SW1 and SW2 are closed. The voltage signal generated by the capacitance drive circuit (84) is therefore applied to the drive electrode (73) inducing a signal in the sense electrode (74) which is converted into a voltage at the output V$_{OUT}$ of the amplifier (101). The magnitude of this output voltage is proportional to the ratio of the projected capacitance (C$_P$) to the feedback capacitor (C$_{FB}$).

Figure 11:
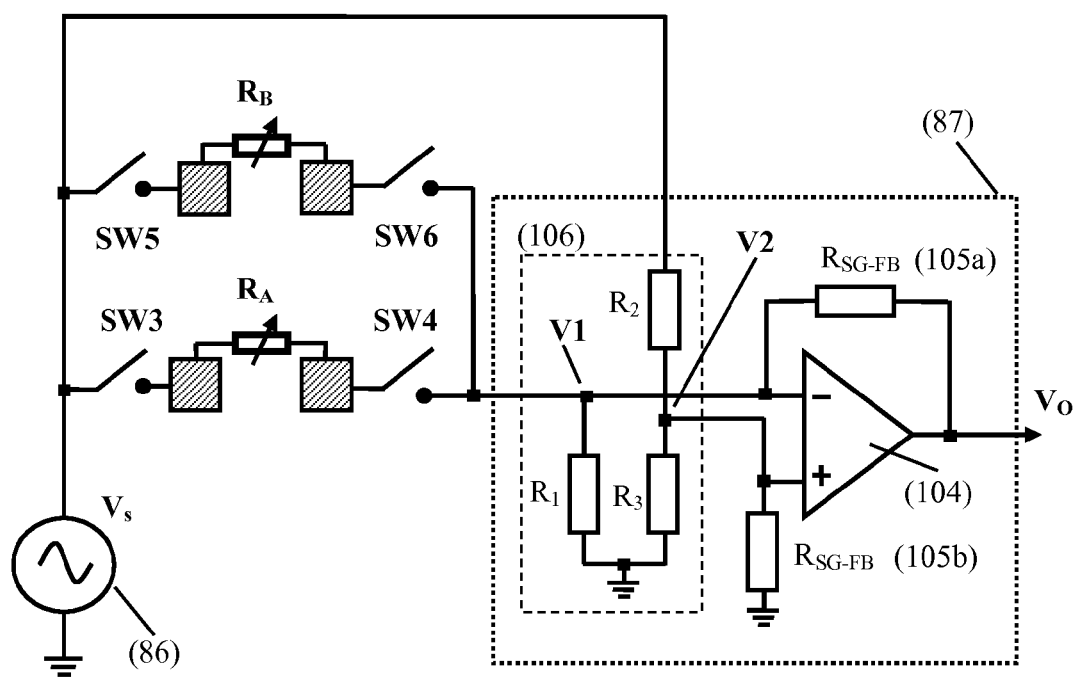

The resistance sensor circuit (83) may comprise a resistance measurement circuit (87) of a known type, for example as disclosed in "Electronic Devices & Circuits, Principles and Applications", N. P. Deshpande, McGraw-Hill, 2007, and shown in FIG. 11. The resistance sensor circuit (83) may also include a resistance drive circuit (86) of known construction, such as an AC voltage source (Vs). The RDC signal, generated by the resistance drive circuit (86) can take the form of a sinusoidal, triangular, a square wave signal or a periodic signal with a defined shape, amplitude and frequency so that it can be measured and further conditioned by the resistance measurement circuit (87). In this exemplary arrangement, the resistance measurement circuit (87) comprises a difference amplifier (104) interfaced to a pair of gain resistors R$_{SG-FB}$FB (105a, 105b) and a bridge circuit (106). The bridge circuit may be configured as a quarter-bridge, formed by three resistors, denoted by R$_1$, R$_2$ and R$_3$ respectively. The bridge circuit (106) is completed by the resistance of the first electrode, R$_A$, or by the resistance of the second electrode, R$_B$. During the first stage of the second period of operation, SW3 and SW4 are closed, connecting the first electrode (73) to the rest of the bridge. The amplifier (104) therefore generates a signal V$_O$ at its output that is proportional to the resistance R$_A$ and hence to the strain induced in the first electrode. Similarly, during the second stage of the second period of operation SW5 and SW6 are closed, the second electrode (74) is connected to the bridge and the amplifier generates a signal V$_O$ at its output proportional to the resistance R$_B$ and hence to the strain induced in the second electrode.

Figure 12A:
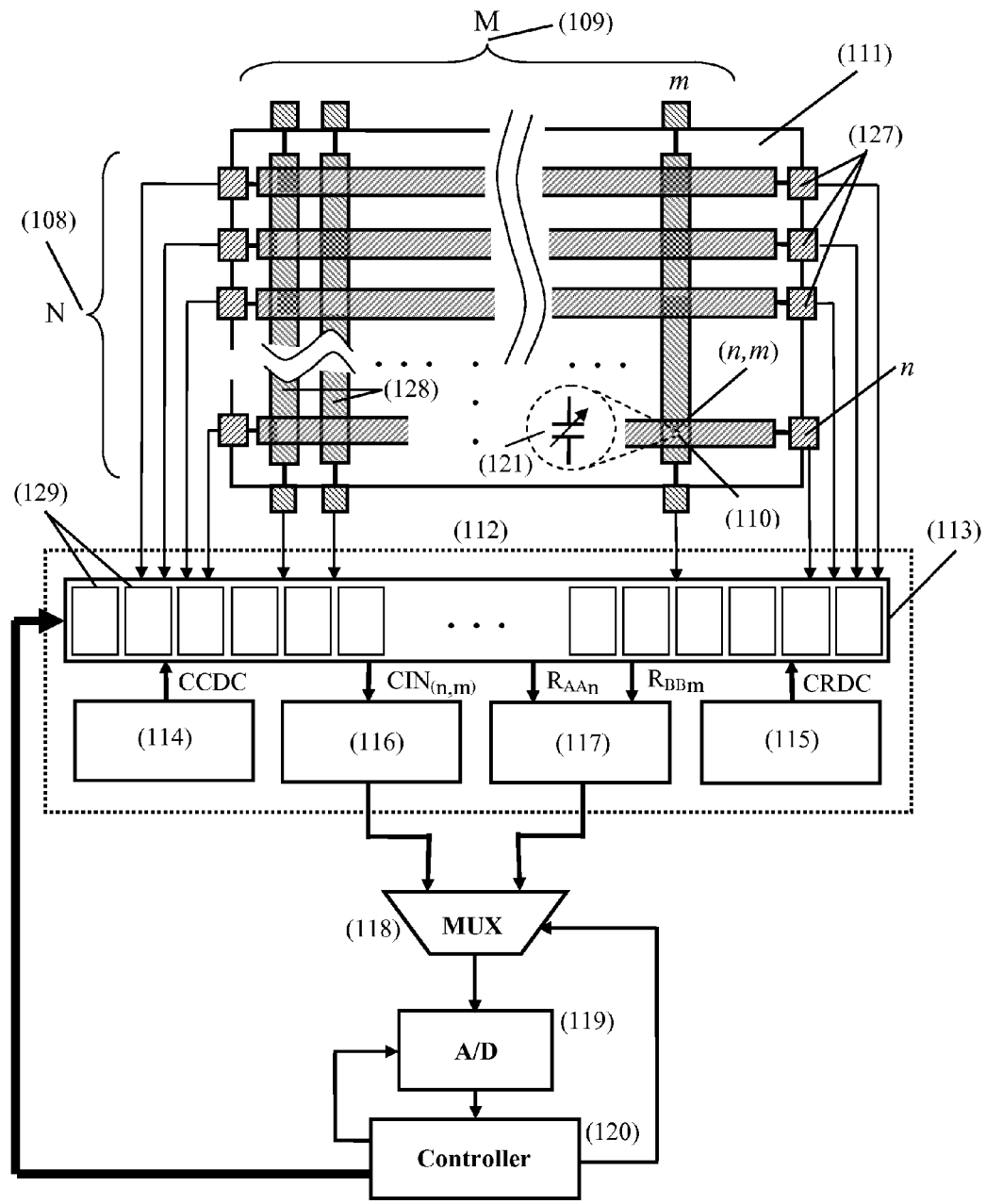

In a second and preferred embodiment of the invention, the dual-function transducer comprises an array (111) of electrodes (e.g., a plurality of electrode arrays) forming a multi-channel touch-panel system, as illustrated in FIG. 12A. In this preferred configuration, the plurality of electrode arrays may be arranged in a row and column format and include a set of row electrodes (108) and a set of column electrodes (109).

The set of row electrodes (108) may comprise a number (N) of individual row electrodes (127). The set of column electrodes (109) may comprise a number (M) of individual column electrodes (128). Each of the row and column electrodes may be patterned with a specific geometry such as the shape shown in FIG. 7C so that every electrode is sensitive to strain (e.g. tensile or compression forces) with a component perpendicular to the plane of the substrate on which the row and column electrodes are formed. In addition, the system comprises a multiplexer circuit (118), an analog-to-digital converter (119), a controller (120) and a common sensor circuit (112). The common sensor circuit may further comprise a common analog decoder (113), a common capacitance drive circuit (114), a common resistance drive circuit (115), a common capacitance measuring circuit (116) and a common resistance measuring circuit (117). The analog decoder circuit may further comprise a plurality of switching stages (129).

The dual-function transducer of this embodiment may be controlled by the controller (120) according to a first and second driving method, similar to the driving methods of a single dual-function transducer described above. However, in this case, the driving methods are applied to measure the projected capacitance associated with each intersection (110) and the strain associated with each electrode in the array. The controller (120) is used to configure the analog decoder (113) to select a particular electrode or intersection for measurement.

Thus, in the first driving method, a change in the projected capacitance can be measured between any selected pair of electrodes in which the selected row electrode (127) acts as the drive electrode and the selected column electrode (128) acts as the sense electrode. The position (n) of the selected row electrode (127) can take the form of any integer value in between 1 and the number of rows, N (i.e. n=1, 2, 3 ..., N). Similarly, the position (m) of the selected column electrode (128) can take any integer value in between 1 and the number of columns, M (i.e. m=1, 2, 3 ..., M). The location of the intersection (110) of the selected row and column electrodes is therefore represented as the coordinates (n,m) in a Cartesian-type arrangement. The projected capacitance at the intersection (110) between the selected first and second electrodes is represented by the variable capacitor $C_{P(n,m)}$ (121). The amplitude of the signal induced in the column (sense) electrode (128) in response to the excitation signal applied to the row (drive) electrode (127) is detected, providing a measurement of the capacitance between the nth row and mth column electrodes. In the second driving method, the resistance of any selected electrode in the array may be measured.

Figure 12B:
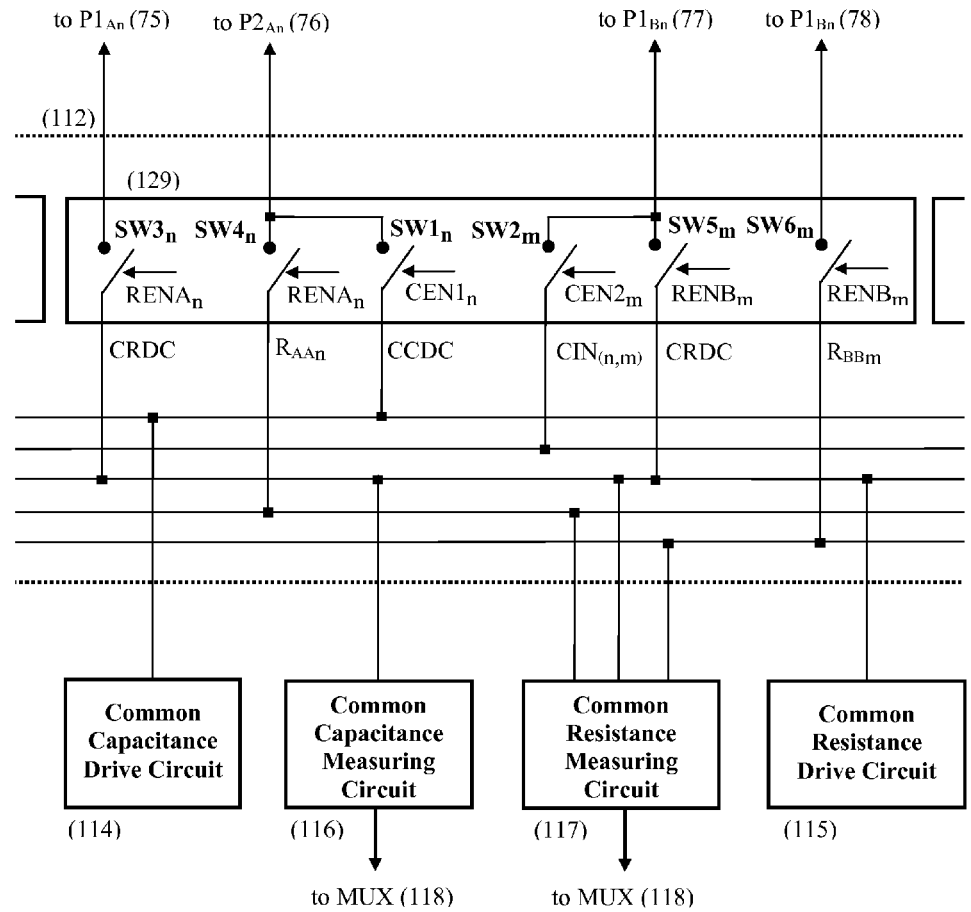

FIG. 12B shows the detail of one switching stage (129) and illustrates the connections from the dual function transducer to the common sensor circuit (112) that may be used to obtain the capacitance and strain measurements according to the first and the second driving methods. The selected row electrode and selected column electrode form an intersection with coordinates (n,m) within the array (111) where n and m correspond to the nth first row electrode (127) and the mth column electrode (128) respectively. The equivalent circuit model of the selected electrodes within the array (111) comprises: a selected nth row electrode (127) that may be represented as a conductor with a variable resistance $R_{An}$ which is a function of the strain applied to that electrode, and a selected mth column electrode (128), that may be depicted as a wire with a variable resistance $R_{Bm}$ which is a function of the strain applied to that electrode. As in the most basic embodiment of the invention, in this preferred embodiment, each electrode is terminated by their corresponding conductive pads (75), (76), (77) and (78) from where signals are driven to and read out by the common sensor circuit (112).

A number of intersections are present in the dual function transducer, formed by the set of row electrodes (108) and the set of column electrodes (109). Each intersection forms a coupling capacitor $C_{P(n,m)}$ (121) which represents the projected capacitance value in between the nth first electrode and the mth second electrode of the sensor array with coordinates (n,m) in a Cartesian-type arrangement. The number of intersections is equal to the product of the number of row electrodes, N, and the number of column electrodes, M, i.e. the total number of intersections is N×M. In order to measure the capacitance associated with each intersection, the total number of capacitance measurements that must be made according to the first driving method, $T_C$=N×M. However, in order to measure the resistance of each electrode in the array, the number of measurements required to be made according to the second driving method will be only the sum of the number of row electrodes and the number of column electrodes, i.e. the total number of resistance measurements, $T_R$=N+M.

Figure 13A:
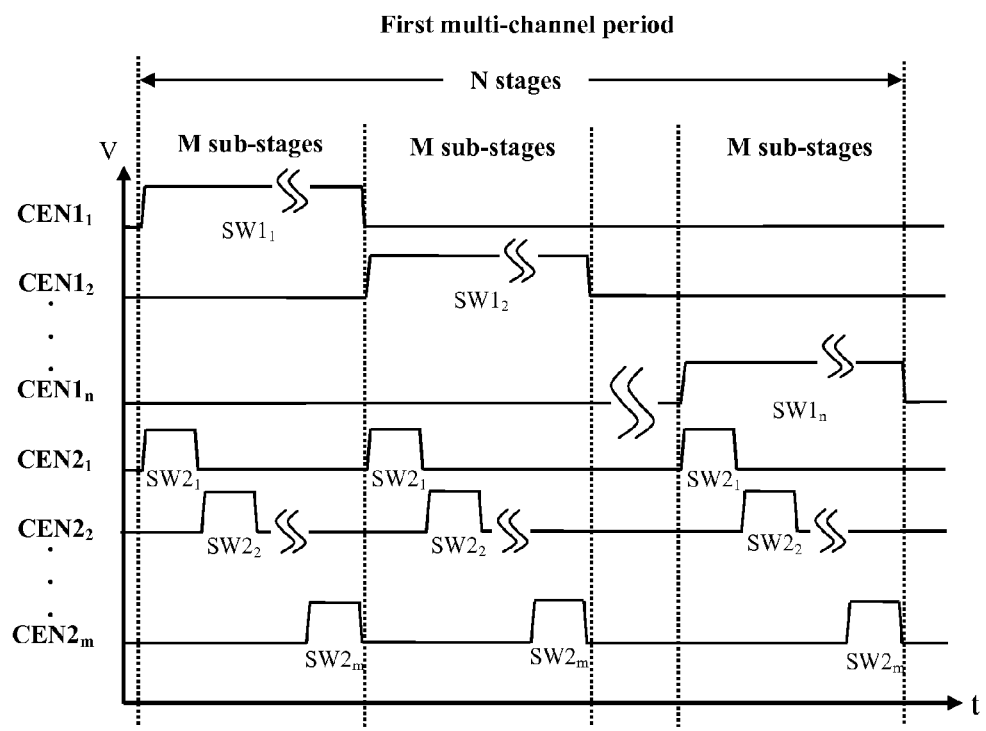
Figure 13B:
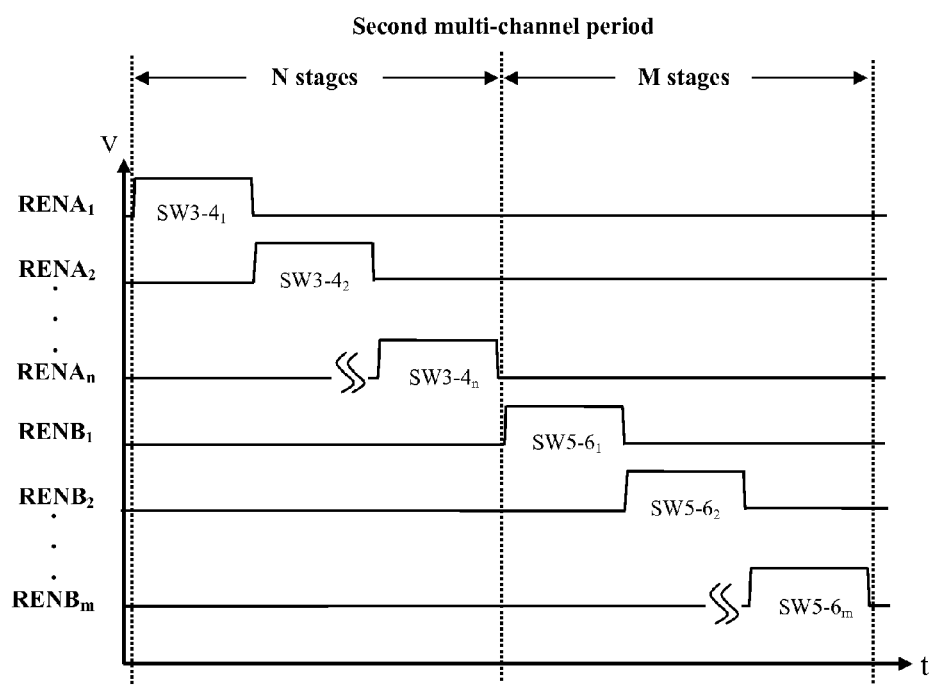

The operation of the dual-function transducer (111) of this preferred embodiment is now described with reference to the system diagram of FIG. 12A, the diagram of FIG. 12B and the waveform diagrams of FIG. 13A and FIG. 13B. In a first period corresponding to the first driving method (FIG. 13A), the capacitance of each intersection in the dual-function transducer is measured in a total of N stages wherein each stage is sub-divided into M sub-stages. During the first stage, switch $SW1_1$ is closed under command of a first enable signal $CEN1_1$ thus connecting the common capacitance drive circuit (114) to the pad $P2_{A1}$ (76) of the first row electrode (127) of the array. A common AC excitation voltage signal, CCDC, is then provided by the common capacitance drive circuit (114) and applied to the pad $P2_{A1}$ (76) configuring the first row electrode (127) as a drive electrode. During a first sub-stage of this first stage, $SW2_1$, corresponding to the first column electrode (128), is closed under command of the second enable signal $CEN2_1$, enabling the capacitance measuring circuit (116) to be connected to the pad $P1_{B1}$ (77). The projected capacitance of the intersection (1,1) in the dual-function transducer may now be measured by the capacitance measuring circuit (116). At the end of the first sub-stage, the enable signal $CEN2_1$ is deactivated and switch $SW2_1$ opens disconnecting the capacitance measuring circuit from the first column electrode (128). During a second sub-stage of the first stage, the enable signal $CEN2_2$ is activated thus closing switch $SW2_2$ and enabling the projected capacitance of the intersection (1,2) to be measured by the capacitance measuring circuit (116). During the remaining sub-stages of the first stage each remaining switch SW2 (i.e. $SW2_3$, $SW2_4$, ..., $SW2_m$), corresponding to each column electrode (128) is closed sequentially under command of each second enable signal CEN2 (i.e. $CEN2_3$, $CEN2_4$, ..., $CEN2_m$) thus enabling the capacitance measuring circuit (116) to measure the projected capacitance of each intersection (i.e. (1,1), (1,2), ..., (1,m)) in one row of the dual-function transducer. At the end of the first stage, the enable signal $CEN1_1$ is deactivated and the switch $SW1_1$ is made open. The enable signal $SW1_2$ is then activated and the projected capacitance of each intersection in the second row of the dual-function transducer is measured in a similar process to that described for the first row. This process is repeated for a total of N stages until a total of N×M measurements corresponding to each intersection in the array have been taken.

In a second period, which may be different from the first time period, corresponding to the second driving method (FIG. 13B) the resistance of each row and column electrode in the dual-function transducer is measured in a total of N+M stages. In a first stage, switches $SW3_1$ and $SW4_1$ are closed under command of an enable signal $RENA_1$ thus connecting the common resistance driving circuit (115) to pad $P1_{A1}$ (75) of the first row electrode (127) and the resistance measuring circuit (127) to both pad $P1_{A1}$ (75) and pad $P2_{A1}$ (76) of the same first row electrode (127). A common AC or DC voltage signal, CRDC, is then generated by the common resistance drive circuit (115) and applied to pad $P1_{A1}$ (75). The strain induced in the first row electrode (73) of the array is now measured by the resistance measuring circuit (117) which measures the resistance of the first row electrode, $R_{A1}$. At the end of the first stage, the enable signal RENA1 is deactivated and switches $SW3_1$ and $SW4_1$ are made open disconnecting the resistance drive circuit and resistance measuring circuit from the first row electrode. In a similar manner, the resistances of the remaining row electrodes are measured in turn in consecutive stages. In each stage, the switches SW3 and SW4 (i.e. $SW3_2$-$SW4_2$, $SW3_3$-$SW4_3$, ... $SW3_n$-$SW4_n$) corresponding to each row electrode (73) are closed under command of their corresponding enable signal RENA (i.e. $RENA_2$, $RENA_3$, ..., $RENA_n$) thus consecutively connecting the common resistance drive circuit (115) and resistance measuring circuit (117) to their corresponding pads. The process of sequentially enabling each row electrode (127) to measure strain is repeated continuously until a total of N measurements have been taken, i.e. the resistance measuring circuit (n) (117) has determined the last electrode's resistance by measuring the amplitude of the last voltage signal, $R_{AAn}$.

Following the measurement of the resistance of each row electrode in the dual-function transducer, the resistance of each column electrode is measured in a similar process in a sequence of M stages. In each of these stages, switches SW5 and SW6 of each column electrode (i.e. $SW5_2$-$SW6_2$, $SW5_3$-$SW6_3$, ..., $SW5_m$-$SW6m$) are sequentially closed under command of each enable signal RENB (i.e. $RENB_2$, $RENB_3$, ..., $RENB_m$) thus consecutively connecting the common resistance drive circuit (115) and resistance measuring circuit (117) to their corresponding pads. Strain induced in each column electrode (128) of the array can therefore be measured. The process of sequentially enabling each row and column electrode in the second period therefore enables the strain of all electrodes in the dual-function transducer to be measured.

For each of the measurements made in both the first and second periods corresponding to the first and second driving methods, the controller (120) continuously commands the common analog decoder (113), the multiplexer (118) and the A/D converter (119) to acquire and digitize raw data. The dual-function transducer array produces two distinctive types of data which correspond to the two distinct driving methods mentioned above.

Figure 14:
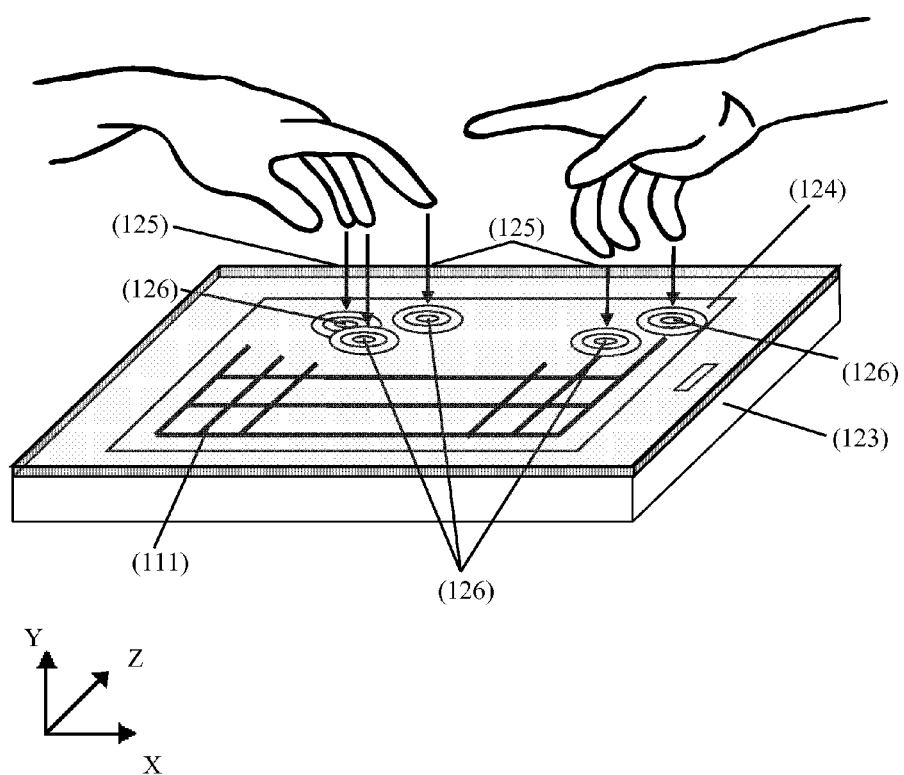

A dual function transducer formed by an array of row and column electrodes such as described above may be employed to create a complete touch panel system as shown in the diagrammatic overview of FIG. 14. The touch panel system consists of a display (123) (e.g. LCD, e-paper, OLED, etc) and a touch panel (124) positioned in front of the display (e.g., on or over an outer surface of the display). The touch panel (124) comprises the aforementioned dual-function transducer (111) which is connected to: the sensing circuitry (112), the multiplexer (118) and the analog-to-digital converter (119) which are further commanded and driven by the controller (120). Within the first driving method, the dual-function transducer is configured as an array of projected capacitive sensors to detect multiple and simultaneous touch input events (125), generated by conductive objects such as human fingers, that may occur at different locations of the touch panel screen (124). Within the second driving method, the dual-function transducer is configured as an array of strain gauge sensors which measure the force applied by each touch of a plurality of input events, generated by conductive or non-conductive input objects. Thus, the transducer array will produce two distinctive types of data which correspond to the two distinct driving methods. The projected capacitive sensor data are used to determine the coordinates (n,m) (126) of each touch generated by conductive input objects and the strain gauge data are employed to extract the force associated with each touch generated by both, conductive and non-conductive input objects.

In a third embodiment, an alternative arrangement of the second embodiment, measurement of the resistance of all electrodes in the array may be performed simultaneously to reduce the total time required for one frame of operation and increase the speed of operation of the touch panel system. In the common sensor circuit of the present embodiment, resistance sensor circuits are provided for each row electrode (127) in the set of row electrodes (108) and each column electrode (128) in the set of column electrodes (109) of the dual-function transducer. In the second period of operation, all switches SW3, SW4, SW5 and SW6 in the analog decoder are closed simultaneously such that each row or column electrode is connected to a corresponding resistance sensor circuit and enabling the resistance of all electrodes in the dual-function transducer to be measured simultaneously. Those knowledgeable in the art will note that there is a wide range of possibilities of alternative driving arrangements that may be employed either to increase the speed of operation of the touch panel system, as described above, or to reduce and optimize the number of sensor circuits. While the current embodiment provides only with an illustration of a driving arrangement, it will be understood that it is not intended to limit the invention. On the contrary, the present invention is intended to cover alternative driving arrangements and modifications which may or may not be included in the exemplary arrangements but are included within the scope of the invention as defined by the claims.

Figure 15A:
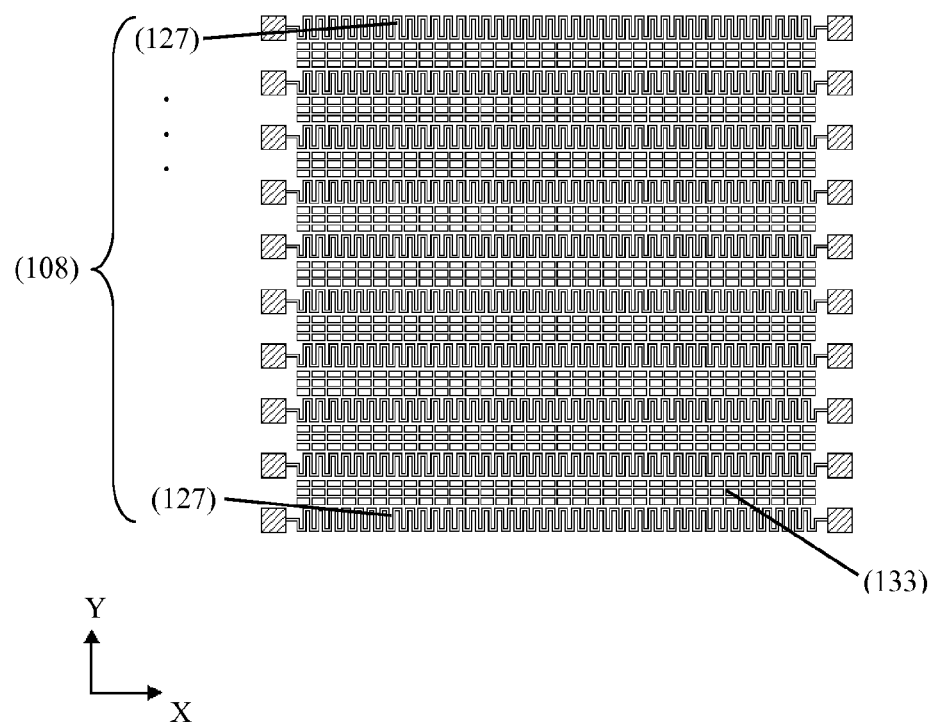
Figure 15B:
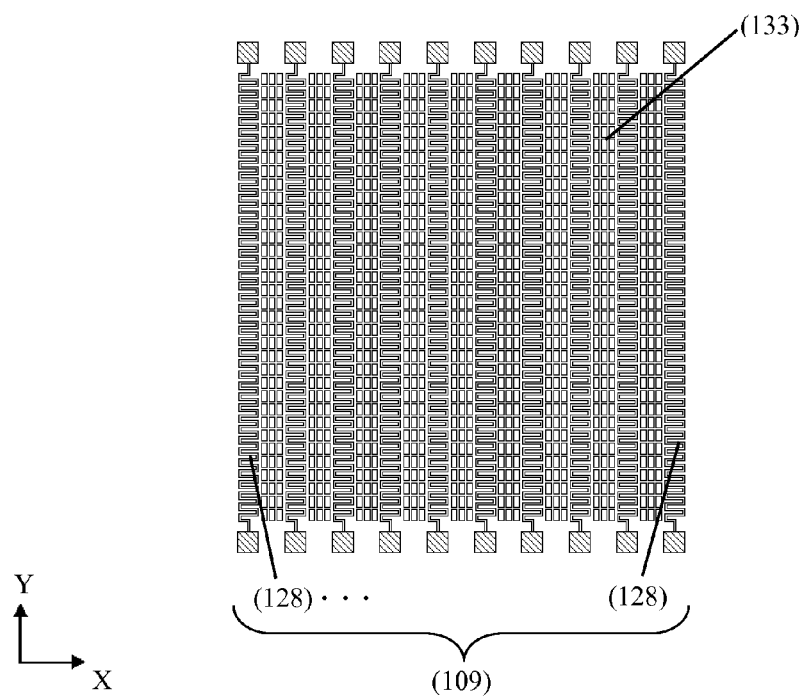
Figure 15C:
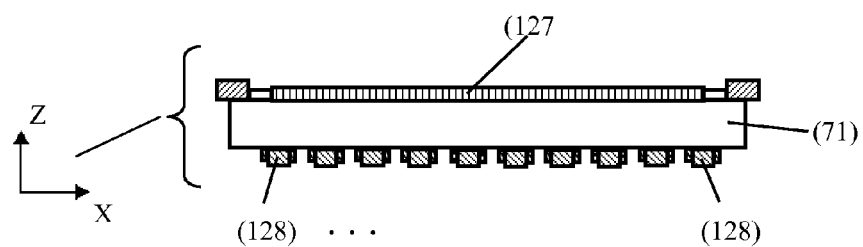
Figure 16:
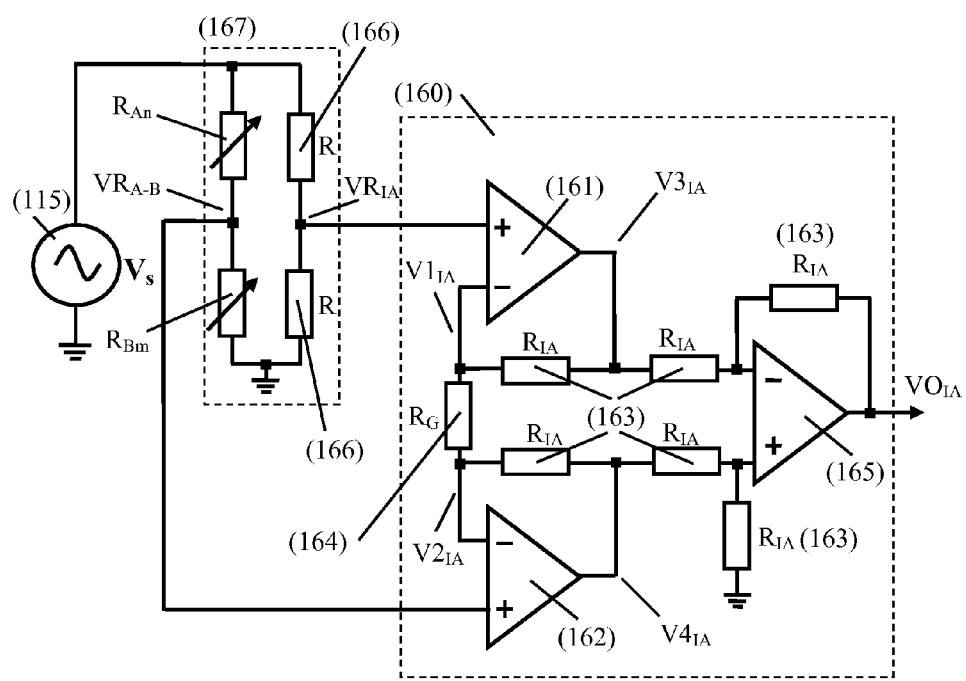

In a fourth embodiment, the dual-function transducer is formed by a set of row electrodes (FIG. 15A) and a set of column electrodes (FIG. 15B) arranged orthogonally in a matrix. As shown in FIG. 15C, the set of row electrodes (108) is formed on the first surface of the transparent substrate (71) and the set of column electrodes (109) is formed on the second surface of the transparent substrate (71). Each of the row and column electrodes is patterned to form a strain sensor according to the pattern of FIG. 7C. As can be seen in FIG. 15A and FIG. 15B, in the space between each of the row electrodes and column electrodes, a number of dummy features (133), which are preferably made of the same material as the electrodes, can be created to improve the visual appearance of the surface on which the electrodes reside. This arrangement may be considered as a dual-layer structure whereby the set of row electrodes (108) generate signals corresponding to strain induced by compressive forces and the set of column electrodes generate signals corresponding to strain induced by tensile forces. The compressive forces measured in each row electrode cause a decrease of resistance on that electrode. On the other hand, tensile forces measured in each column electrode cause and increase of resistance of that electrode. The mechanical layout of the structure is therefore arranged in such a way that the structure is capable of producing signals that can be used in a differential measurement system. For example, the differential signals may be advantageously used to amplify the effects of strain while minimizing the otherwise adverse common mode noise signals such as noise, interference from the display operation or false strain readings induced by temperature variations. FIG. 16 shows an example of a circuit suitable for performing measurements of the differential signals generated by the dual-function transducer of the present embodiment. The measurement circuit consists of a resistor bridge circuit (167) configured as a half-bridge and an instrumentation amplifier (160) capable of generating an output signal with high signal-to-noise ratio. This type of circuit is well-known, for example as disclosed in "A designer's Guide to Instrumentation Amplifiers", C. Kitchin, L. Counts, Analog Devices, 2006, and shown in FIG. 16. The resistor bridge circuit (167) further consists of two identical bridge resistors R (166), a row electrode (127), represented by $R_{An}$ as well as a column electrode (128), represented by $R_{Bm}$, both connected simultaneously. The instrumentation amplifier (160) consists of a first buffered amplifier (161) a second buffered amplifier (162), a set of six matched resistors $R_{IA}$ (163), a gain resistor $R_G$ (164) and a differential amplifier (165).

The operation of the measurement circuit is now briefly described. First, the right hand side of the resistor bridge circuit (167) can be considered as a voltage divider which sets a voltage $VR_{IA}$ equal to half the amplitude of that generated by the common resistance drive circuit (115), denoted by $V_S$. Also, the left hand side of the resistor bridge circuit (167) can be considered as a voltage divider which sets a voltage $VR_{A-B}$ proportional to the difference in resistances in between $R_{An}$ and $R_{Bm}$. Ideally and without any strain applied to either the row electrode (127) or the column electrode (128), the magnitude of $VR_{A-B}$ is equal to half the amplitude of $V_S$. Due to the bridge circuit's configuration, any variations in resistance common to both electrodes, such as those caused by temperature variation, will be cancelled out such that the output of the measuring circuit (160) remains constant. However, due to mechanical arrangement of the structure of the present embodiment, if an external force is applied to the plane of the substrate (71) on which the electrodes are formed, the row electrode (127) will decrease in resistance and the column electrode (128) will increase in resistance. Accordingly, provided the resistors R and the resistors $R_{IA}$ are well-matched, the amplifier (160) will generate a voltage signal at its output terminal $VO_{IA}$ that is proportional to the changes in electrode resistance that are caused by induced strain.

Figure 17A:
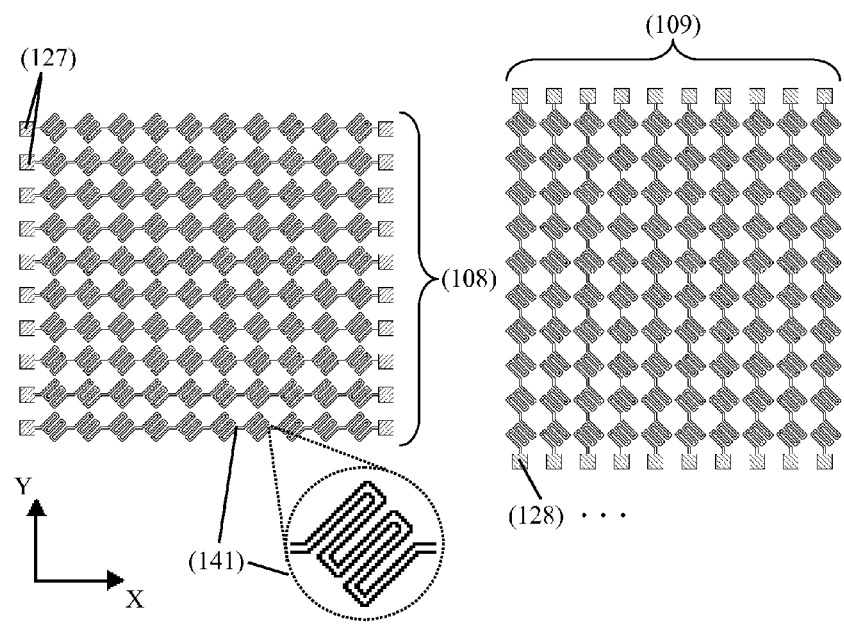
Figure 17B:
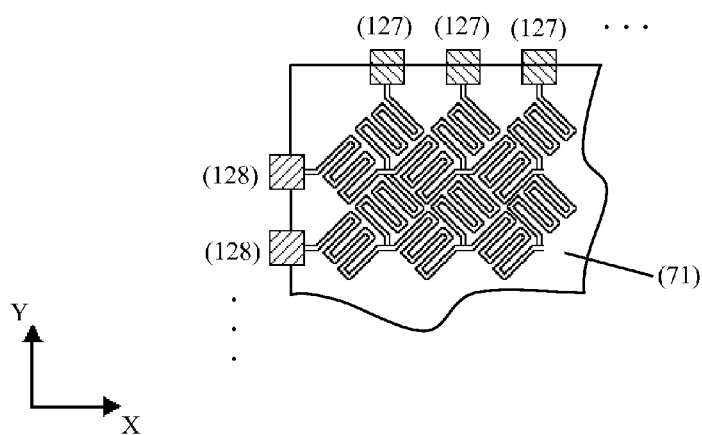

In a fifth embodiment of this invention, the dual-function transducer comprises an array of electrodes patterned to form an interlocking rhombus structure as illustrated in FIG. 17A and FIG. 17B. The dual function transducer is arranged as a set of row electrodes (108) and set of column electrodes (109) wherein each row electrode (127) and each column electrode (128) is patterned into sections and each section is patterned to form strain sensors (141). FIG. 17A, shows the top view diagrams of the electrodes patterned in accordance with the present embodiment. As illustrated in FIG. 17B, the interlocking rhombus structure is produced when both sets of electrodes are overlapped using the transparent insulator substrate (71) as medium. Each electrode may be considered as a series of individual strain sensors electrically connected together in series that will generate a change in resistance according to strain similar to that previously described. The arrangement of electrodes according to the present embodiment may form a dual-layer structure, similar to the arrangement of the fourth embodiment. However, the dummy features (133) described in the previous embodiment of this invention may not be needed in this particular case because the interlocking rhombuses can fill in the majority of gaps for a uniform top view. This particular pattern has the advantage of having a single ITO film in the stack when viewed from the top, which may allow a better transmittance of light through the LCD display (not shown in FIG. 17B) underneath.

Figure 18A:
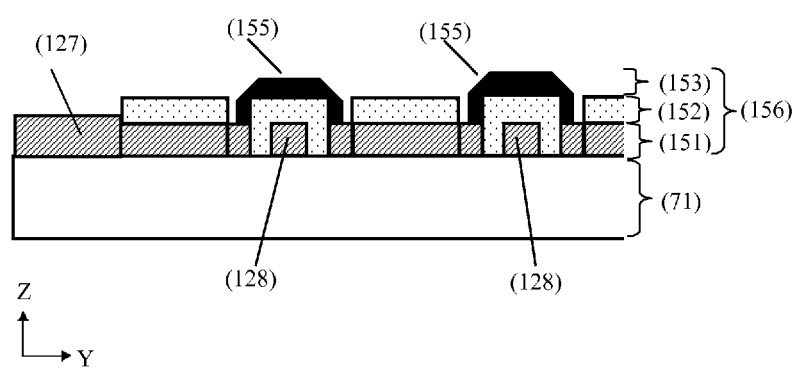
Figure 18B:
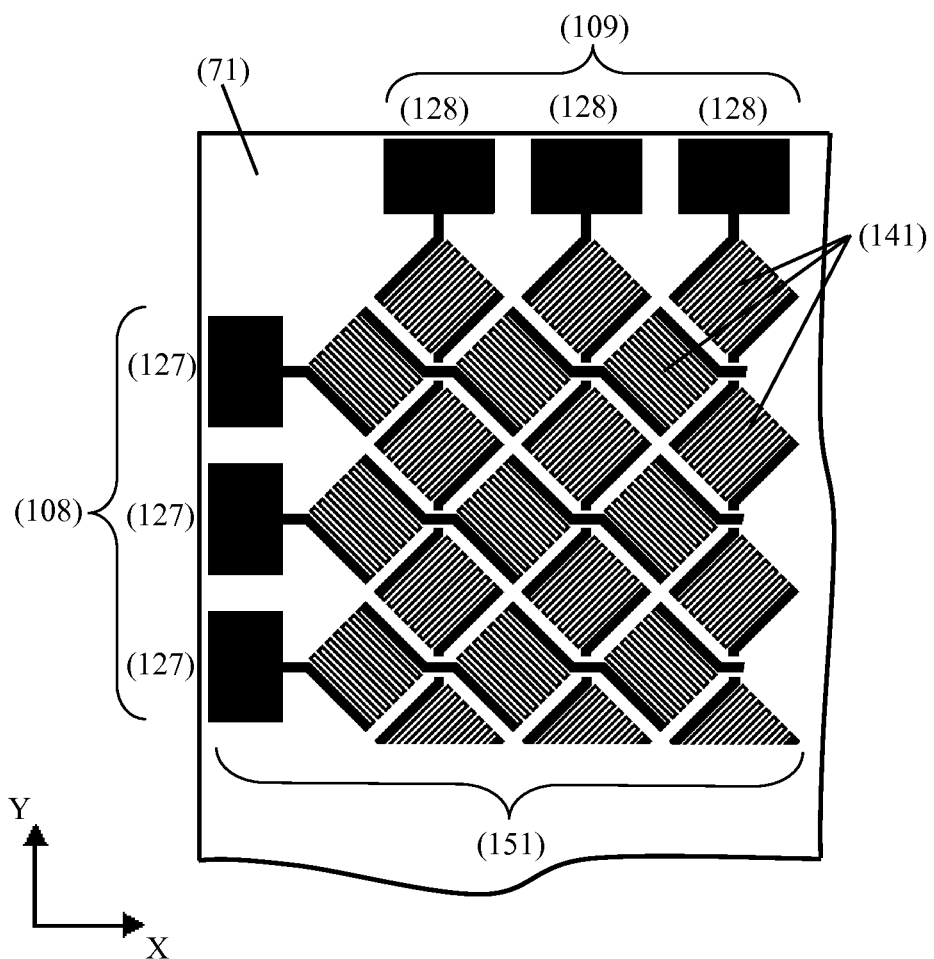
Figure 18C:
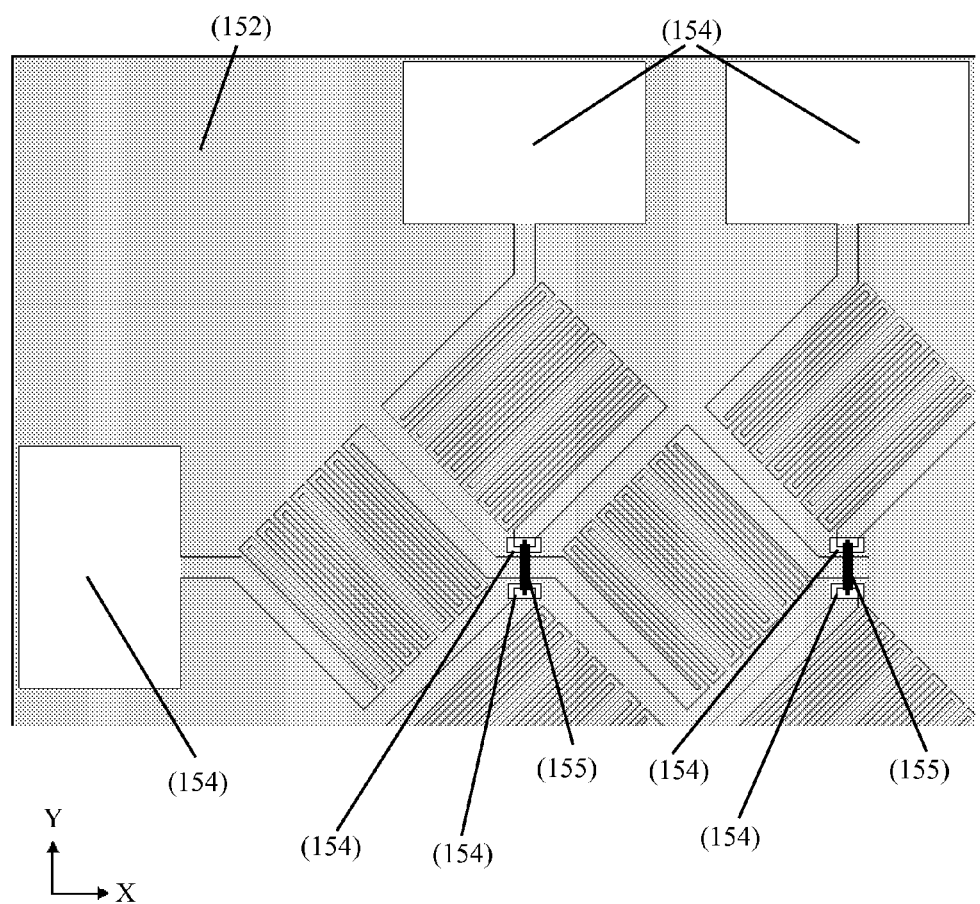

In a sixth embodiment of the present invention, an array of dual-function transducers is built employing a single-layer structure. The structure consists of a substrate (71) and a single-layer transducer arrangement (156) formed on or over the substrate, wherein the single-layer transducer arrangement may be made, for example, of interlocking rhombuses. However, the structure arrangement can be made of any other geometric pattern. The single-layer transducer arrangement (156) further comprises an electrode grid layer (151), an insulating layer (152) formed over the grid layer (151), and a metal bridge layer (153) formed over the insulating layer 152, see cross-sectional view in FIG. 18A. In a preferred configuration of this embodiment, shown in FIG. 18B, a set of row electrodes (108) is formed by individual row electrodes (127) in a transparent conductive material directly on the substrate (71) and patterned to form a set of rhomboidal strain sensors (141) which are connected in series. A set of column electrodes (109) is also formed by individual column electrodes (128) in a transparent conductive material directly on the same side of the substrate (71). However, the individual rhomboidal strain sensors forming each of the column electrodes (128) remain unconnected in the transparent conductive material. Both sets of electrodes form a single electrode grid (151). An insulating layer (152) is formed by a transparent insulating material, for example silicon dioxide, on top of the electrode grid (151) and patterned so that regions or in which electrical connections (154) are needed remain uncovered. Such regions to remain uncovered by the insulating layer include the conductive pads (75) and (76) of each row electrode (127), the conductive pads (77) and (78) of each column electrode (128) and both extremes of the unconnected individual rhomboidal strain sensors (141) which are arranged to form the column electrodes (see FIG. 18C). The metallization layer (153) is then formed on top of the insulating layer (152) and uncovered regions and subsequently patterned to form a set of metal bridges (155) which connect adjacent individual rhomboidal strain sensors together in series to form a set of electrically contiguous column electrodes. This particular arrangement has the advantage of having a single ITO film in the stack when viewed from the top, which may allow a better transmittance of light through the LCD display. At the same time, since the ITO layer is formed on the same side of the substrate, high optical uniformity is achieved as well. However, since this structure is of a single-layer construction, only compressive or tensile forces may be measured but not both. For example, if the electrode layer is formed on top of the substrate (71), only compression forces can be detected, conversely, if the electrode layer is formed on the bottom of the substrate, only tension forces can be detected.

Figure 19:
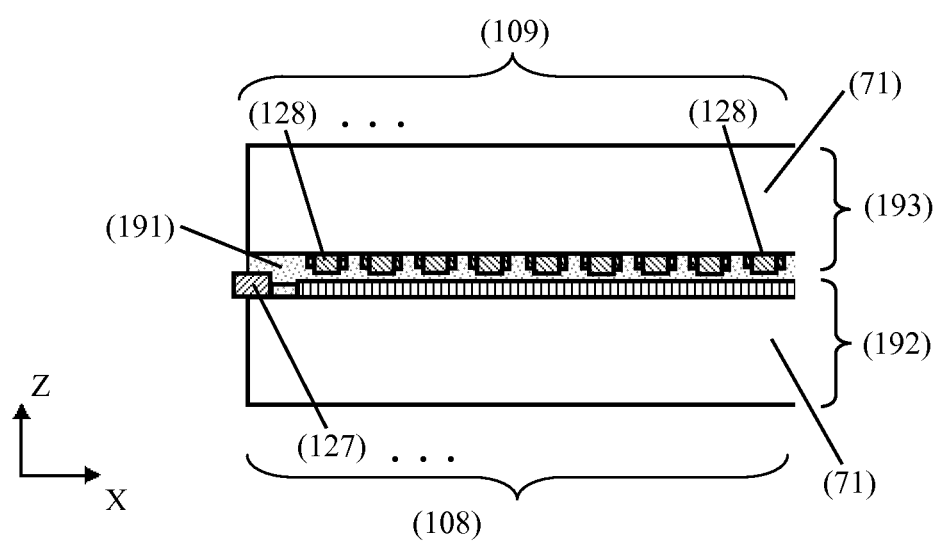

In a seventh embodiment of the present invention the mechanical layout of the stack is arranged as a dual-layer structure with improved optical uniformity, strain responsivity and noise immunity. In a preferred configuration of this embodiment, shown in FIG. 19, the dual-layer electrode structure consists of a first transparent substrate (71), a set of row electrodes (108) formed by individual row electrodes (127), a bonding electrical insulator (191), a set of column electrodes (109), formed by individual column electrodes (128) and a second transparent substrate (71). The set of row electrodes (108) can be patterned to form a strain sensitive structure as described in previous embodiments, for example, in a rhomboidal pattern. This set of row electrodes (108) is formed on the top surface of the first transparent substrate

(71) and forms a first layer (192). The set of column electrodes (74) are patterned to form a strain sensitive structure and are formed on the bottom surface of the second transparent substrate (71) creating a second layer (193). The first layer (192) and second layer (193) are arranged together in a dual-layer, or sandwich, structure with the set of row electrodes (108) and set of column electrodes (109) facing each other and the bonding electrical insulator (191) inserted between the layers. The bonding electrical insulator (191) is formed by a thin, transparent and flexible bonding material, which may preferably also be thermally conductive. Such a bonding material may be a well-known substrate such as a photopolymer or any silicon-based organic polymer such as polydimethylsiloxane (PDMS). This structure works in such a way that when force is applied on top of the structure, the set of row electrodes (73) will receive tensile strain and a signal will be generated by the measuring circuit corresponding to a decrease in resistance of the electrodes. Similarly, the set of column electrodes (74) will receive compressive strain and a signal will be generated by the measuring circuit corresponding to an increase in resistance of the electrodes. The signals produced by a pair of electrodes comprising a row electrode and a column electrode can be used in a differential system to increase the sensitivity of the measurement circuit to strain, such as the circuit shown in FIG. 16. These differential signals may be useful to minimize or eliminate the otherwise adverse effects of common mode noise and interference such as that caused by the operation of the display. Accordingly, the signal-to-noise ratio of the touch panel system may be improved. Further, the unwanted response of the touch panel system to temperature variations may be minimized in a differential arrangement as is now described. Since the set of row electrodes (108) and the set of column electrodes (109) are in very close proximity and separated by only a thin thermal conductor, the temperature changes in the nth row electrode (127) is similar temperature changes in the mth column electrode (128). One electrode of a pair, for example the row electrode (127) can therefore be used as a reference to compensate the other electrode of a pair, for example, the column electrode, for changes in temperature. In addition, since the set of row electrodes (108) are in very close proximity to the set of column electrodes (109), the optical uniformity of the arrangement when viewed from the top is improved.

Figure 20:
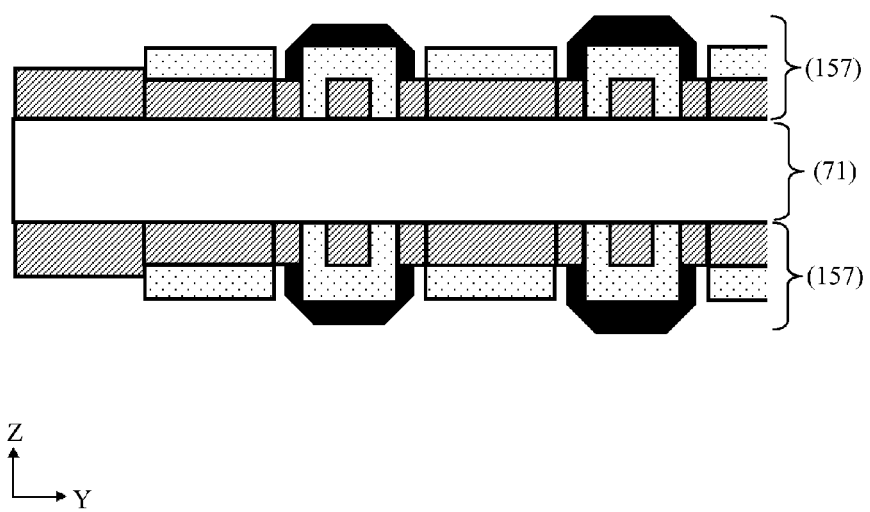

In an eighth embodiment of the present invention a multi-layer structure is formed by two single-layer structures, such as—but not limited to—interlocking rhombus structures with bridge connections as previously described, on both sides of the (first) transparent substrate (71). The multi-layer structure consists of a transparent substrate (71), a first single-layer electrode structure, such as an interlocking rhombus structure (157), arranged on a first side of the first transparent substrate, and a second single-layer electrode structure, such as another interlocking rhombus structure (157), arranged on a second side of the first transparent substrate, as can be seen in the cross-sectional view in FIG. 20. This particular arrangement has the advantage of having a layer of electrodes that can be used as a dual-function transducer and a layer of electrodes that can be used as reference for temperature compensation only. The second single-layer of interlocking rhombus structure (157) may only serve as reference for the first single-layer interlocking rhombus structure and not as a set of dual-function transducers.

Figure 21:
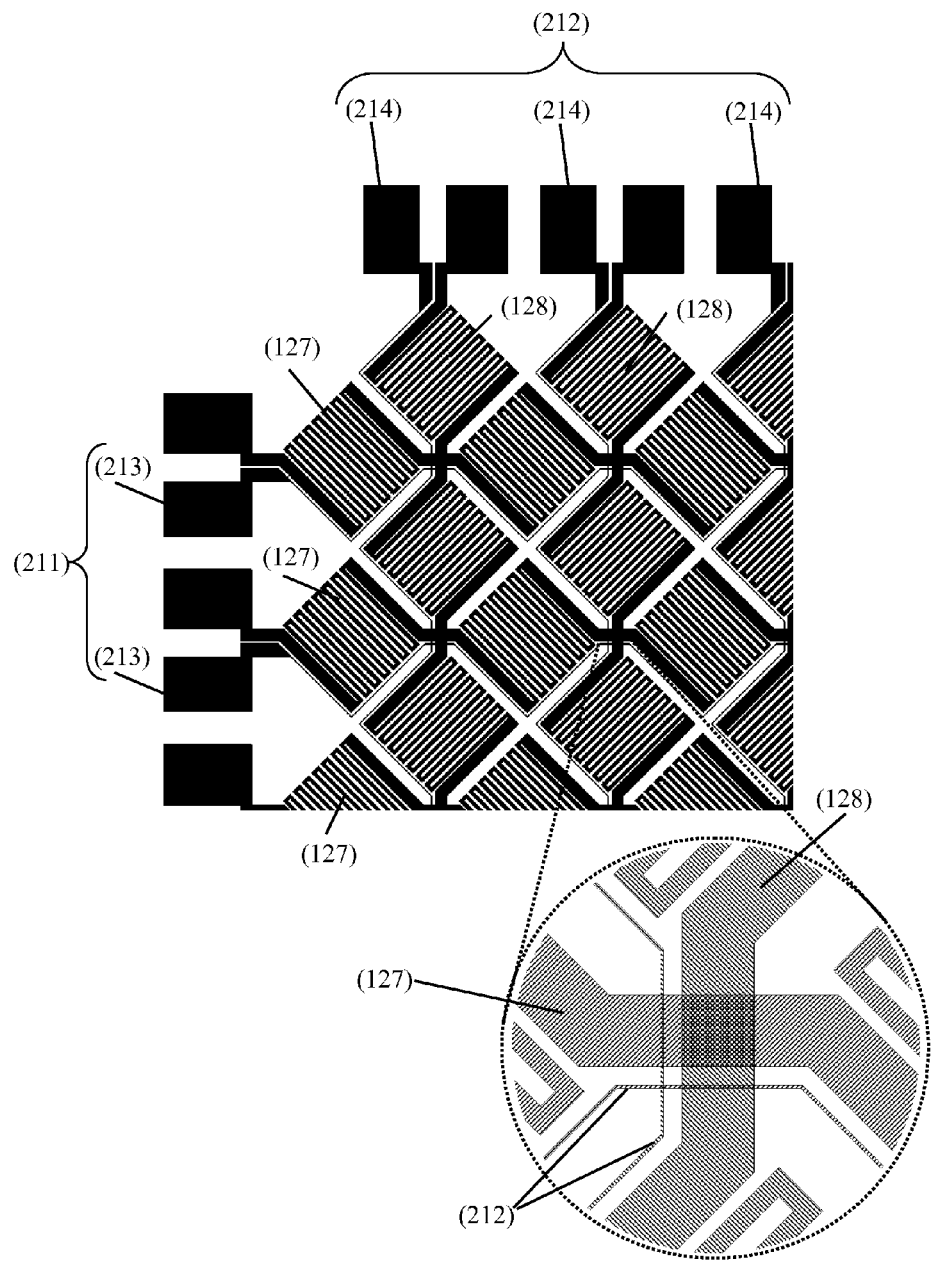

FIG. 21 shows an example dual-function transducer in accordance with a ninth embodiment of the present invention. In this embodiment, the immunity of the strain measurement to changes in temperature and other common mode non-idealities is improved through the addition of a set of row reference electrodes (211) and a set of column reference electrode (212) to the dual function transducer. The sets of reference electrodes (211), (212) may be made of the same or different material than the material used to produce the sensing electrodes. If the material of the reference electrode is different to that of the sensing electrode then the conductivity of the material used for the reference electrodes is chosen to have a similar temperature response as that of the sensing electrodes. The set of reference electrode may be formed on the same or a different side of the same or a different substrate, parallel and adjacent to the sensing electrodes—i.e. the row electrodes (127) and column electrodes (128)—for which compensation is required. In a preferred configuration of the current embodiment, each row sensing electrode (127) is compensated by a single row reference electrode (213) and each column sensing electrode (128) is compensated by a single column reference electrode (214). The pattern of the row and column reference electrodes (213), (214) is designed so that its resistance matches the nominal resistance of the corresponding sensing electrode but is substantially independent of strain (relative to the strain sensing electrode). An example of a reference electrode with pattern that is relatively insensitive to strain can be seen in FIG. 21. Since the sensing electrodes and the reference electrodes are in close proximity, the temperature changes in the nth row sensing electrode (127) are similar to temperature changes in the adjacent nth row reference electrode (213). Identically, the temperature changes in the mth column electrode (128) are similar to temperature changes in the mth column reference electrode (214).

Figure 22:
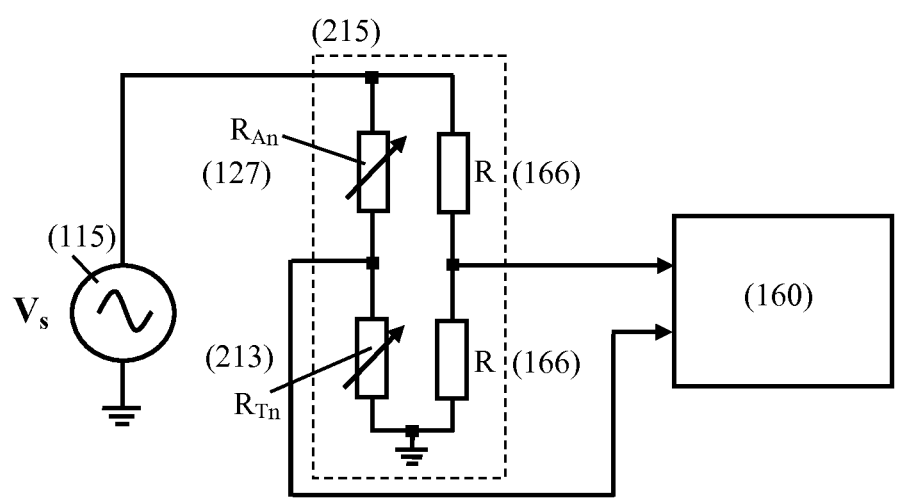

The resistances of a pair of electrodes comprising a sensing electrode and a reference electrode may be measured in a differential sensing circuit, such as the circuit shown in FIG. 22. This arrangement is similar to that of the seventh embodiment of this invention and is now briefly described. Each row sensing electrode (127) (or column sensing electrode (128)) along with its corresponding row reference electrode (213) (or column reference electrode (214)) form part of a bridge circuit (215). The resistance of the selected sensing electrode, $R_{An}$ (e.g. a row electrode) and the resistance of the corresponding reference electrode, $R_{Tn}$ (e.g. a row reference electrode) are connected in series and form a half-bridge which gives an output voltage proportional to the ratio of these resistances. The bridge circuit (215) further comprises a couple of identical resistors R (166) which form a second half-bridge whose output is half the voltage of that generated by the common resistance drive circuit (115). A differential amplifier (160), such as the instrumentation amplifier previously described, is electrically connected to the output of each half-bridge to amplify the difference between the two output voltages. When force is applied to the structure, the resistance of both the sensing electrode will change but that of the reference electrode will not and the output of the differential amplifier will therefore change in proportion to the applied force. However, changes in resistance common to both the sensing electrode and the reference electrode, for example caused by temperature variations, will result in no change to the differential amplifier output (the circuit provides a measurement of force that is independent of temperature).

This differential measurement technique therefore minimizes or eliminates not only the effects of common mode noise and interference but also the effect of temperature fluctuations. Accordingly, the signal-to-noise ratio of the touch panel system is improved.

Figure 23:
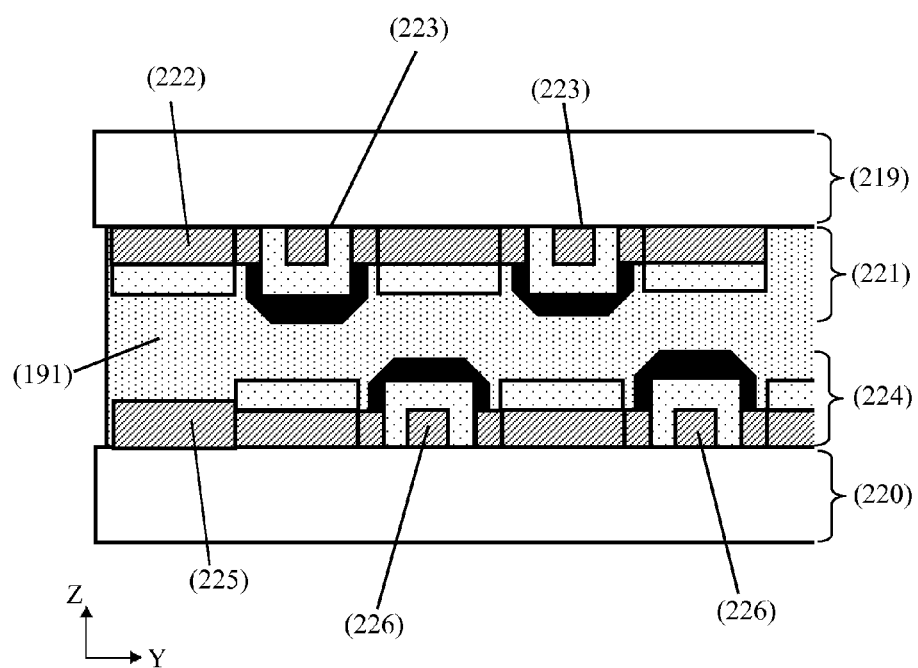
FIG. 23—Cross-section view of the dual-function transducer arrangement of the tenth embodiment

A limitation of the reference electrode arrangement described in the ninth embodiment is that it is suitable for performing temperature compensation only when the reference electrode is made of a material which does not exhibit the piezo-resistive effect. If the reference electrode is made of a material in which the change in resistance in response to strain is dominated by the piezo-resistive effect, patterning the electrode as described will not significantly reduce its sensitivity to strain. In a tenth embodiment of the present invention, a means of compensating for changes in temperature with reference electrodes formed in a piezo-resistive material is described. In this arrangement, the reference electrodes may be sensitive to changes in strain as well as temperature. The reference electrodes may be designed to have the same resistance, including temperature response, as that of a corresponding sensing electrode. The geometry (pattern) of each strain-responsive reference electrode may also be similar to the geometry of the sensing electrode. However, the reference electrodes are arranged such that their change in resistance due to applied strain is of the opposite sign to that of the corresponding sensing electrode. This can be accomplished by a mechanical arrangement of sense and reference electrodes in which for example, one electrode, e.g. the sensing electrode, is subject to tension and the other electrode e.g. the reference electrode, is subject to compression forces. An example of such an arrangement where the sensing electrodes and the reference electrodes are formed by a dual-layer structure on two opposing substrates is now described. In a preferred configuration, shown in FIG. 23, the dual-layer structure consists of a first interlocking single-layer electrode structure (221) formed on a first transparent substrate (219) and a second interlocking single-layer electrode structure (224) formed on a second transparent substrate (220). The first transparent substrate (219) and second transparent substrate (220) are arranged opposite each other with the first interlocking single-layer electrode structure (221) separated from the second interlocking single-layer electrode structure (224) by a bonding electrical insulator layer (191). The first interlocking single-layer electrode structure (221) further consists of a set of sensing electrodes formed by individual row sensing electrodes (222) and by individual column sensing electrodes (223). Similarly, the second single-layer electrode structure (224) further consists of a set of reference electrodes formed by individual row reference electrodes (225) and by individual column reference electrodes (226)

The first interlocking single-layer electrode structure (221) and the second interlocking single-layer electrode structure (224) are arranged together in a dual-layer, or sandwich, structure with sensing and reference electrodes facing each other and the bonding electrical insulator (191) inserted between them. The bonding electrical insulator (191) is formed by a thin, transparent and flexible material, which may preferably also be thermally conductive. Such a bonding material may be a well-known substrate such as a photopolymer or any silicon-based organic polymer such as polydimethylsiloxane (PDMS).

The operation of this structure as a dual-function transducer is now described. In a first driving method, the capacitance associated with each row and column intersection is measured as previously described. During the first driving method the row sensing electrodes (222) and row reference electrodes (225) may be connected together and the column sensing electrodes (223) and the column reference electrodes (226) may be connected together. The row electrodes (222), (225) may therefore act together as the drive electrodes (or alternatively the sense electrodes) and the column electrodes (223), (226) may act together as the sense electrodes (or alternatively the drive electrodes) in the capacitance measurement. In a second driving method, the resistance of each sensing electrode is measured as previously described. For each sensing measurement, a sensing electrode, for example a row sensing electrode (222), is arranged together with a reference electrode, for example a row reference electrode (225), to form a half-bridge in the bridge circuit (215). The reference electrode is chosen to correspond to the same location as the sensing electrode such that the temperature of both electrodes is the same. The sensing and reference electrode are connected in a bridge structure as shown in FIG. 22 and previously described. When force is applied to this structure, the sensing electrode (e.g., a first or second electrode), formed on the first substrate (219), will receive compressive strain and the corresponding reference electrode, formed on the second substrate (220), will receive tensile strain. The change in resistance on the reference electrode caused by the applied force will therefore be of equal magnitude but opposite sign to that of the sensing electrode. The change in resistance of the reference electrode due to temperature will however be the same sign and magnitude as that of the sensing electrode. The differential circuit (160) will therefore generate an output signal only as a result of the applied force and will be independent of temperature.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The invention may find several applications in mid-size and large-size touch panel screens for industrial and consumer electronics, it is therefore ideally suited for products such as, but not limited to mobile phones, e-tablets, PDAs, e-readers, net-books, e-readers, Satellite Navigation systems and the like.

The invention claimed is:

1. A dual-function transducer for a force-sensitive multi-touch screen, comprising:
   a first substrate;
   at least one electrode array formed on the first substrate, the at least one electrode array including first and second electrodes, wherein a resistance of at least one of the first electrode or the second electrode is a function of strain on the respective first electrode or second electrode; and
   circuitry operatively coupled to the first and second electrodes, the circuitry configured to measure first and second electrical properties of the electrode array, at least one of the first or second electrical properties comprising a resistance measurement of the first or second electrode, the first and second electrical properties corresponding to touch and strain, respectively.

2. The transducer according to claim 1, wherein at least one of the first electrode or the second electrode shows piezoresistive characteristics or is patterned to enable detection of tension or compression forces for a force component that is perpendicular to a plane of the first substrate on which the first and second electrodes are formed.

3. The transducer according to claim 1, wherein at least one of the first or second electrode is patterned such that the at least one of the first or second electrode is responsive to changes in both capacitance and strain.

4. The transducer according to claim 3, wherein the electrode pattern comprises at least one of a square-wave pattern, a sinusoidal pattern, or a zig-zag pattern.

5. The transducer according to claim 1, wherein the first electrode is formed on a first surface of the first substrate and the second electrode is formed on a second surface of the first substrate to create a coupling capacitor between the first and second electrodes.

6. The transducer according to claim 1, wherein the first substrate comprises at least one of glass, plastic or polyethylene.

7. The transducer according to claim 1, wherein the at least one electrode array comprises a plurality of electrode arrays, and the electrodes of each electrode array form a multi-channel touch panel system.

8. The transducer according to claim 7, wherein the plurality of electrode arrays are arranged in a row and column format, and the first and second electrodes of the plurality of electrode arrays form a set of row electrodes and a set of column electrodes, respectively.

9. The transducer according to claim 7, wherein the circuitry comprises a controller configured to drive the plurality of electrode arrays in a first mode for measuring a capacitance at an intersection of the respective first and second electrodes, and a second mode for measuring the strain within individual electrodes of the electrode array.

10. The transducer according to claim 9, wherein the controller is configured to measure the strain based on a change in resistance of the first and/or second electrode of each electrode array.

11. The transducer according to claim 9, wherein the controller is configured to detect multiple and simultaneous touch input events generated by a conductive object within a predetermined distance of or contacting one or more of the plurality of electrode arrays.

12. The transducer according to claim 9, wherein the controller is configured to measure capacitance during a first time period, and measure strain during a second time period, the second time period different from the first time period.

13. The transducer according to claim 12, wherein the controller is configured to simultaneously measure strain for each electrode of the plurality of electrode arrays.

14. The transducer according to claim 1, wherein the circuitry comprises:
a capacitance measuring circuit operatively coupled to the at least one electrode array and configured to measure a capacitance of the at least one electrode array; and
a resistance measuring circuit operatively coupled to the at least one electrode array and configured to measure a resistance of the at least one electrode array.

15. The transducer according to claim 14, wherein the circuitry further comprises a decoder circuit operatively coupled to the at least one electrode array, the capacitance measuring circuit and resistance measuring circuit, the decoder circuit configured to selectively couple the at least one electrode array to the capacitance measuring circuit and the resistance measuring circuit.

16. The transducer according to claim 1, wherein the at least one electrode array is patterned to form an interlocking rhombus structure.

17. The transducer according to claim 16, wherein the interlocking rhombus structure comprises the first and second electrodes of the at least one electrode array arranged in an overlapping configuration.

18. The transducer according to claim 1, wherein the at least one electrode array is formed as a single-layer electrode structure arranged over the first substrate.

19. The transducer according to claim 18, wherein the single-layer electrode structure comprises an electrode grid layer arranged over the first substrate, an insulating layer arranged over the electrode grid layer, and a metal bridge layer arranged over the insulating layer.

20. The transducer according to claim 1, wherein the at least one electrode array is formed as a multi-layer electrode structure.

21. The transducer according to claim 20, wherein multi-layer electrode structure comprises:
a first layer including a set of row electrodes formed on a top surface of the first substrate;
a second substrate;
a second layer including a set of column electrodes formed on a bottom surface of the second substrate, wherein the first layer and second layer face each other; and
a bonding electrical insulator layer arranged between the first and second layers.

22. The transducer according to claim 1, wherein the multi-layer electrode structure comprises:
a first single layer electrode structure arranged on a first side of the first substrate; and
a second single layer electrode structure arranged on a second side of the first substrate.

23. The transducer according to claim 1, further comprising a reference electrode formed adjacent to at least one of the first or second electrodes, wherein a geometry of the reference electrode is configured such that a resistance of the reference electrode corresponds to a nominal resistance of the first or second electrode and is independent of strain.

24. The transducer according to claim 23, further comprising a differential amplifier electrically coupled to the reference electrode and at least one of the first or second electrodes, the differential amplifier operative to provide a measurement of force applied to the first or second electrode that is independent of temperature.

25. The transducer according to claim 1, further comprising a reference electrode formed adjacent to at least one of the first or second electrodes, wherein the reference electrode is arranged to provide a change in resistance due to an applied force, the change in resistance opposite a change in resistance of the at least one first or second electrode due to the applied force.

26. The transducer according to claim 25, wherein when a force is applied to the first or second electrode, the first or second electrode receives one of a compressive strain or a tensile strain, and the reference electrode receives the other of the compressive strain or the tensile strain.

27. The transducer according to claim 1, wherein the first substrate is a transparent substrate.

28. A display device, comprising:
a display; and
a touch panel including a plurality of transducers according to claim 1, the touch panel arranged over an outer surface of the display.

29. The transducer according to claim 1, wherein the first substrate is formed from a material having electrical properties that are insensitive to an applied force.

30. The transducer according to claim 1, wherein force-electrical transduction is performed by materials of the electrode array.

31. The transducer according to claim 1, wherein the first substrate comprises a non-deformable substrate.

32. The transducer according to claim 1, wherein the circuitry configured to measure electrical properties corresponding to strain comprises both a first and second electrical connection to one of the first electrode or the second electrode of the at least one electrode array.

33. A method of measuring capacitance and strain for a plurality of cells of a touch panel, the touch panel including a plurality of electrode arrays, respective ones of the plurality of electrode arrays corresponding to respective ones of the plurality of cells, the plurality of electrode arrays formed on a substrate and including first and second electrodes, wherein a resistance of at least one of the first electrode or the second electrode is a function of strain on the respective at least one first electrode or second electrode, and wherein each electrode array is patterned such that the first and second electrodes are responsive to changes in both capacitance and strain, the method comprising:

selectively coupling each electrode array to a capacitance measuring circuit;
measuring a capacitance for multiple and simultaneous touch events on the touch panel; and
correlating a change in capacitance for each cell to a location of an independent touch event.

34. The method according to claim 33, wherein measuring the capacitance comprises configuring the electrode array as a projected capacitance sensor.

35. The method according to claim 33, wherein measuring the capacitance comprises measuring the capacitance at an intersection of the first and second electrodes.

36. The method according to claim 33, further comprising:
selectively coupling each electrode array to a resistance measuring circuit;
measuring a change in resistance of each electrode; and
correlating the change in resistance to a force applied to the cell.

37. The method according to claim 33, wherein measuring the capacitance is performed during a first time period, and measuring the change in resistance is done during a second time period different from the first time period.

* * * * *